United States Patent
Tominaga et al.

(10) Patent No.: US 11,545,881 B2
(45) Date of Patent: Jan. 3, 2023

(54) COIL WINDING APPARATUS AND COIL WINDING METHOD AND A COIL MANUFACTURING METHOD USING THEREOF

(71) Applicant: NITTOKU Co., Ltd., Saitama (JP)

(72) Inventors: Ryuto Tominaga, Nakatsugawa (JP); Takayuki Hasebe, Nakatsugawa (JP)

(73) Assignee: NITTOKU CO., LTD., Saitama (JP)

( * ) Notice: Subject to any disclaimer, the term of this patent is extended or adjusted under 35 U.S.C. 154(b) by 30 days.

(21) Appl. No.: 17/282,339

(22) PCT Filed: May 11, 2020

(86) PCT No.: PCT/JP2020/018834
§ 371 (c)(1),
(2) Date: Apr. 1, 2021

(87) PCT Pub. No.: WO2020/235378
PCT Pub. Date: Nov. 26, 2020

(65) Prior Publication Data
US 2021/0351673 A1 Nov. 11, 2021

(30) Foreign Application Priority Data
May 23, 2019 (JP) .............................. JP2019-096540

(51) Int. Cl.
*H02K 15/04* (2006.01)
(52) U.S. Cl.
CPC .................................. *H02K 15/04* (2013.01)

(58) Field of Classification Search
CPC ............... H02K 15/04; H02K 15/0435; H02K 15/0442; H02K 15/045; H02K 15/14;
(Continued)

(56) References Cited

U.S. PATENT DOCUMENTS 3,765,080 A * 10/1973 Lauer .................. H02K 15/0442
29/605
7,467,648 B2 * 12/2008 Hashimoto ........ H02K 15/0435
140/71 C
(Continued)

FOREIGN PATENT DOCUMENTS

JP       S48-10505 A     2/1973
JP      H10-271733 A    10/1998
(Continued)

*Primary Examiner* — Peter Dungba Vo
*Assistant Examiner* — Joshua D Anderson
(74) *Attorney, Agent, or Firm* — Rabin & Berdo, P.C.

(57) ABSTRACT

The coil winding apparatus is for manufacturing a coil by winding a wire rod around a winding core rotated by a rotating mechanism, wherein the winding core has a base plate and a plurality of winding pins erected on the base plate, and a circumferential groove into which a wire rod are put is formed on the periphery of the plurality of winding pins. The rotation mechanism is provided with a rotatable rotating plate, a drive mechanism for rotating the rotating plate, and a pair of columnar members erected on the rotating plate so as to put a rotation center with between a pair of the columnar members. An inner base plate is mounted to a tip of the pair of columnar members, and the coil winding apparatus is provided with an outer winding core moving mechanism.

7 Claims, 14 Drawing Sheets

(58) Field of Classification Search
CPC ........ H01F 41/04; H01F 41/06; H01F 41/061;
H01F 41/063; H01F 41/064; H01F
41/066; H01F 41/068; H01F 41/069;
H01F 41/082; H01F 41/088; H01F 41/09;
H01F 41/092; Y10T 29/49009; Y10T
29/49071
See application file for complete search history.

(56) References Cited

U.S. PATENT DOCUMENTS

| 2017/0229946 A1 | 8/2017 | Sato et al. |
| 2019/0115813 A1 | 4/2019 | Tominaga et al. |

FOREIGN PATENT DOCUMENTS

| JP | 2000-245120 A | 9/2000 |
| JP | 2003-319622 A | 11/2003 |
| JP | 2016-039719 A | 3/2016 |
| JP | 2018-064404 A | 4/2018 |

* cited by examiner

COIL WINDING APPARATUS AND COIL WINDING METHOD AND A COIL MANUFACTURING METHOD USING THEREOF

TECHNICAL FIELD

The present invention relates to a coil winding apparatus and a coil winding method and a coil manufacturing method using thereof.

BACKGROUND ART

Conventionally a stator of a generator or a motor has a cylindrical stator core including a plurality of teeth (magnetic poles) arranging radially and protruding radially in a row in the inner diameter direction and a plurality of slots opening between the teeth, and a stator coil assembled to a stator core by storing peripheral parts of the coil in the slots. With respect to the assembly of the stator coil, JP2000-245120A discloses a so-called inserter method of assembling the stator coil, in which the stator coil and the stator core are individually pre-made in advance, and then the stator coil is housed in each slot of the stator core.

On the other hand, in recent years, an efficient dynamo-electric machine for energy saving has been demanded from the market, and generally, by improving a density of the coils installed in the slot of the stator core, that is, a space factor, dynamoelectric machines are able to achieve a higher efficiency. In order to improve such the space factor, JPH10-271733A discloses a technique for mounting a regularly wound coil in a slot. The coils are pre-regularly wound outside the slot into bundles of cross-sections corresponding to the cross-sectional section of the slot, and the coils are inserted in the radial direction from the opening side of the slot, while retaining their shape. The coil is inserted in the radial direction of the slot from the opening side of the slot with a width equal to the width of the slot, while retaining the shape of the coil.

However, even if a coil aligned and wound on a bundle of cross-sections corresponding to the cross-section of the slot is made outside the slot, if peripheral parts of the coil shapes cannot be maintained until it is inserted into the slot, a problem arises that it becomes difficult to insert peripheral parts of the coil into the slot.

In view of this point, the applicant has proposed a coil manufacturing apparatus, the coil manufacturing apparatus is provided with a bundling mechanism, the bundling mechanism has an outer circumference corresponding to an inner circumference of the coil to be made, and is configured to bundle the suspending the wire rod in a winding core having flanges formed at both ends of a drum member in which a wire rod is wound around the outer circumference, wherein a recess is formed on the drum member, the wire rod is suspended in the recess, and the floating wire rod is bundled in the recess (for example, refer to JP2016-39719A).

In this coil manufacturing apparatus, the shape of peripheral parts of the coil can be maintained until the coil is inserted into the slot because the wire rod suspending at the recess are bundled.

SUMMARY OF INVENTION

On the other hand, in order to improve the space factor of the coil, the wire rod which are wound directly onto the drum member must be wound in close contact with each other without crossing each other and parallel to each other. If the wire rod is displaced from their original position or if the wire rod cross each other, the ordinality is disturbed and it is difficult to improve the space factor of the coil. In order to achieve this regular winding, it is considered that a recessed groove may be formed on the drum member to allow the wire rod to put into the drum member, and the wire rod may be put into the recessed groove to prevent the wire rod from shifting.

However, in the case of the winding core with the drum member that matches the inner shape of the coil, if the recessed groove is formed to put into the wire rod on the entire circumference of the drum member, apart from the groove for suspending the wire rod, inconveniently, required manhours for forming the recessed groove is significantly increased, and the unit cost of the winding core including the drum member is increased.

In order to solve this inconvenience, it is considered that the recessed groove to put the wire rod is formed only at the corner of the drum member, thereby reducing the area where the recessed groove is formed, which is cheaper than the case where the recessed groove is formed all around the drum member.

However, when the recessed groove is formed at the corner of the drum member, the recessed groove becomes straight and the wire rod put in the recessed groove becomes curved. Therefore, the curved wire rod does not adhere to the straight recessed groove, and the wire rod can easily detach from the recessed groove. It remains to be left as a problem to be solved that it is difficult to hold the wire rod in place at the corner of the drum member.

In the case of the stator coil used in generators, motors, etc., as shown in FIG. 12, each peripheral part of the coil 13a, 14a, which forms one winding layer, is divided into several parts, and the several parts are inserted to several slots 11b (two slots 11b in FIG. 12) respectively.

In this case, the stator coil 12 includes an inner coil 13 that accommodates peripheral parts of the coil 13a on both sides in the slot 11b in a predetermined spaced and an outer coil 14 that accommodates peripheral part of the coil 14a in the slot 11b neighboring outside of the slot 11b in which the inner coil 13 is accommodated. However, even in such the stator coil 12, it is difficult to improve the space factor of the coil unless the wire rod comprising those coils 13 and 14 are wound in close contact with each other and in a parallel without crossing each other.

An object of the present invention is to provide a coil winding apparatus, a coil winding method and a coil manufacturing method thereof, which are relatively inexpensive, and which enables a coil comprising a wire rod wound in regular winding without shifting of the wound wire rod.

Another object of the present invention is to provide a coil winding apparatus, a coil winding method and a coil manufacturing method thereof, which enables a coil comprising an inner coil and an outer coil continuing the inner coil winding a wire rod in regular winding without shifting of the wound wire rod.

According to an aspect of the present invention, provided is a coil winding apparatus configured to manufacture a coil by winding a wire rod around a winding core rotated by a rotating mechanism, wherein the winding core has a base plate and a plurality of winding pins erected on the base plate; and a circumferential groove into which the wire rod are put is formed on a periphery of each of the plurality of winding pins.

According to another aspect of the present invention, provided is a coil winding apparatus configured to manufacture a coil by winding a wire rod around a winding core rotated by a rotating mechanism, wherein the winding core has an inner base plate; an inner winding core having a plurality of inner winding pins to form an inner coil with the wire rod erected on the inner base plate and wound around the wire rod; an outer base plate having a larger periphery than a periphery of the inner base plate; and an outer winding core having a plurality of outer winding pins, and the plurality of outer winding pins encircling the inner coil by the wire rod erected on the outer base plate and wound around the wire rod, and a circumferential groove into which the wire rod are put is formed on a periphery of each of the plurality of winding pins.

DESCRIPTION OF EMBODIMENTS

Next, the best mode for carrying out the present invention will be described with reference to the drawings.

Figure 2:
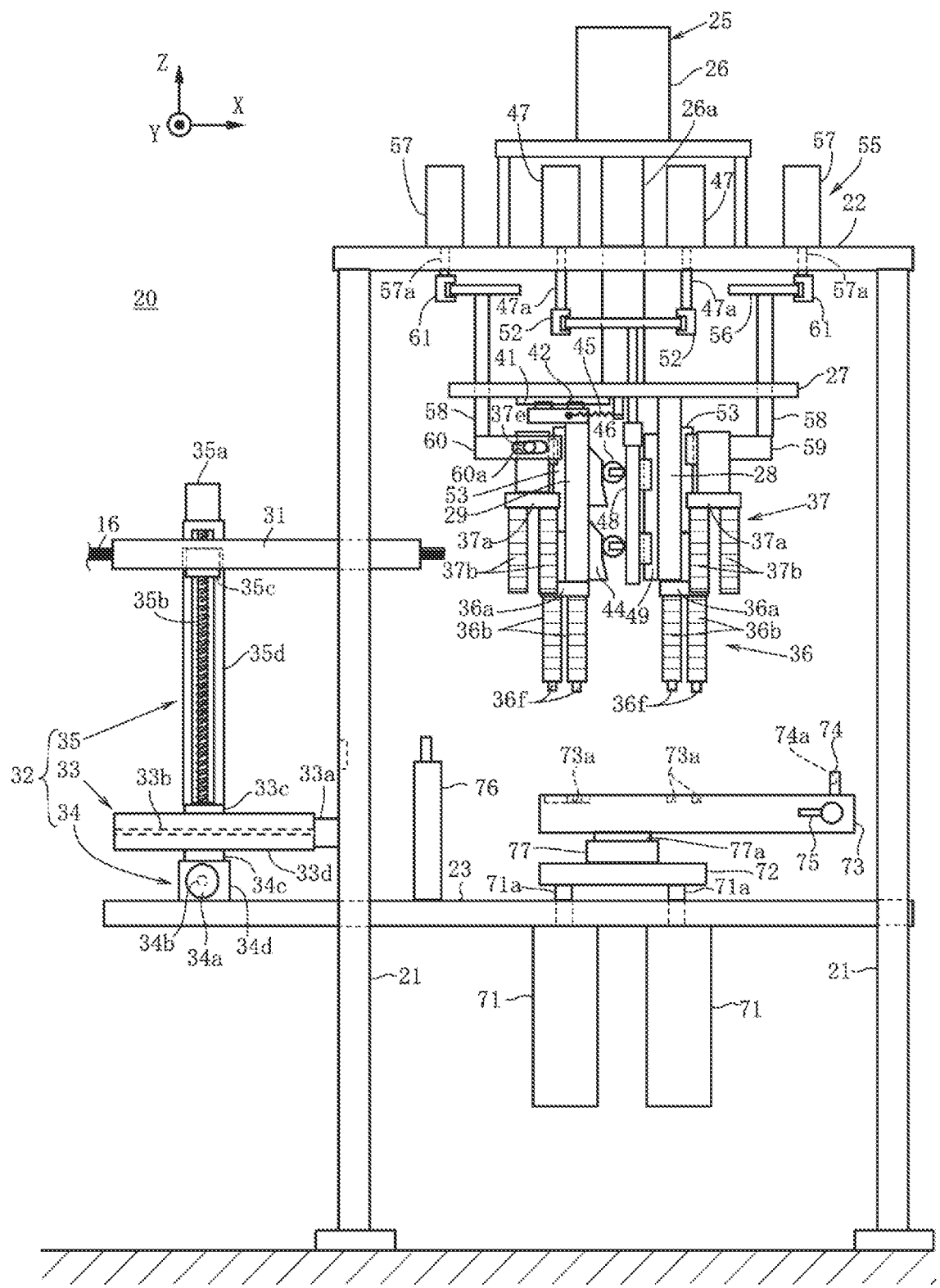
FIG. 2 is a front view of the coil winding apparatus.

FIG. 2 shows a coil winding apparatus 20 for the present invention. Here, three axes of X, Y and Z orthogonal to each other are set. Then, the coil winding apparatus 20 according to the present invention will be described assuming that the X-axis extends in the horizontal direction, the Y-axis extends in the horizontal front-back direction, and the Z-axis extends in the vertical direction.

Figure 13:
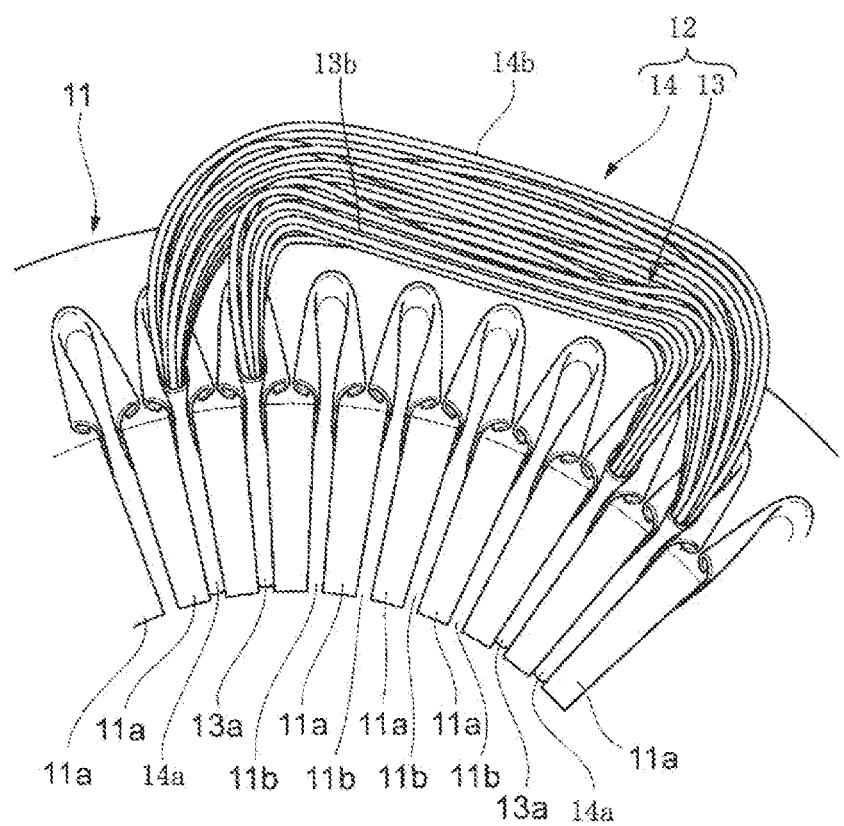
FIG. 13 is an enlarged top view of the one of several stator coils having the inner coil and the outer coil being inserted into the several slots
Figure 14:
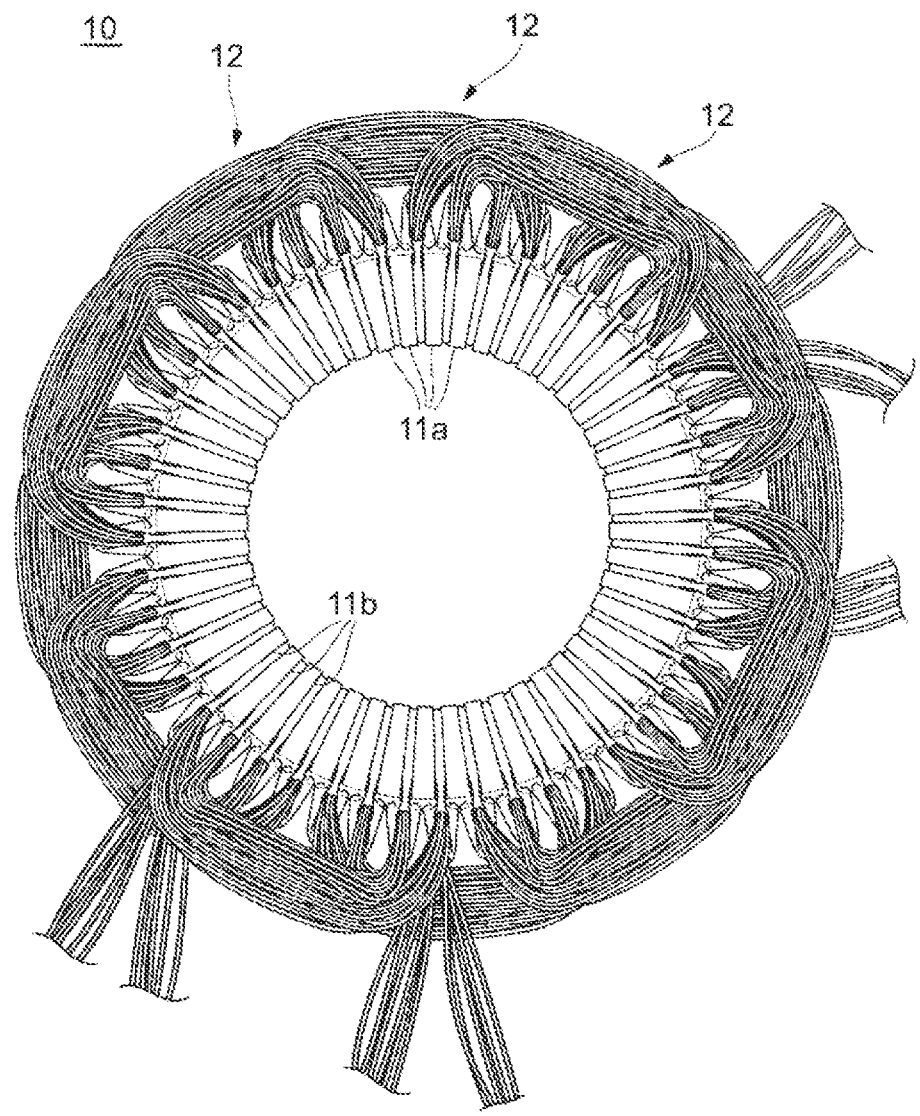
FIG. 14 is a top view showing the stator in which a plurality of the stator coils is mounted on a stator core.

As shown in FIG. 13 and FIG. 14, a stator 10 of a generator or a motor has a cylindrical stator core 11 including a plurality of teeth 11a (magnetic poles) arranging radially and protruding radially in a row in the inner diameter direction and a plurality of slots 11b which opens between a plurality of the teeth 11a, and a stator coil 12 assembled in the stator core 11.

The coil winding apparatus 20 in this embodiment is an apparatus for producing a winding of the stator coil 12 used in the stator 10 (FIG. 14) of a three-phase AC generator. That is, the coil winding apparatus 20 is an apparatus for producing the stator coil 12 to be inserted into the slot 11b of stator core 11 such as a generator or a motor. Also, as shown in FIG. 13, the coil winding apparatus 20 is effective for inserting peripheral parts 13a and 14a of the stator coil 12 into the two slots 11b, respectively.

Figure 12:
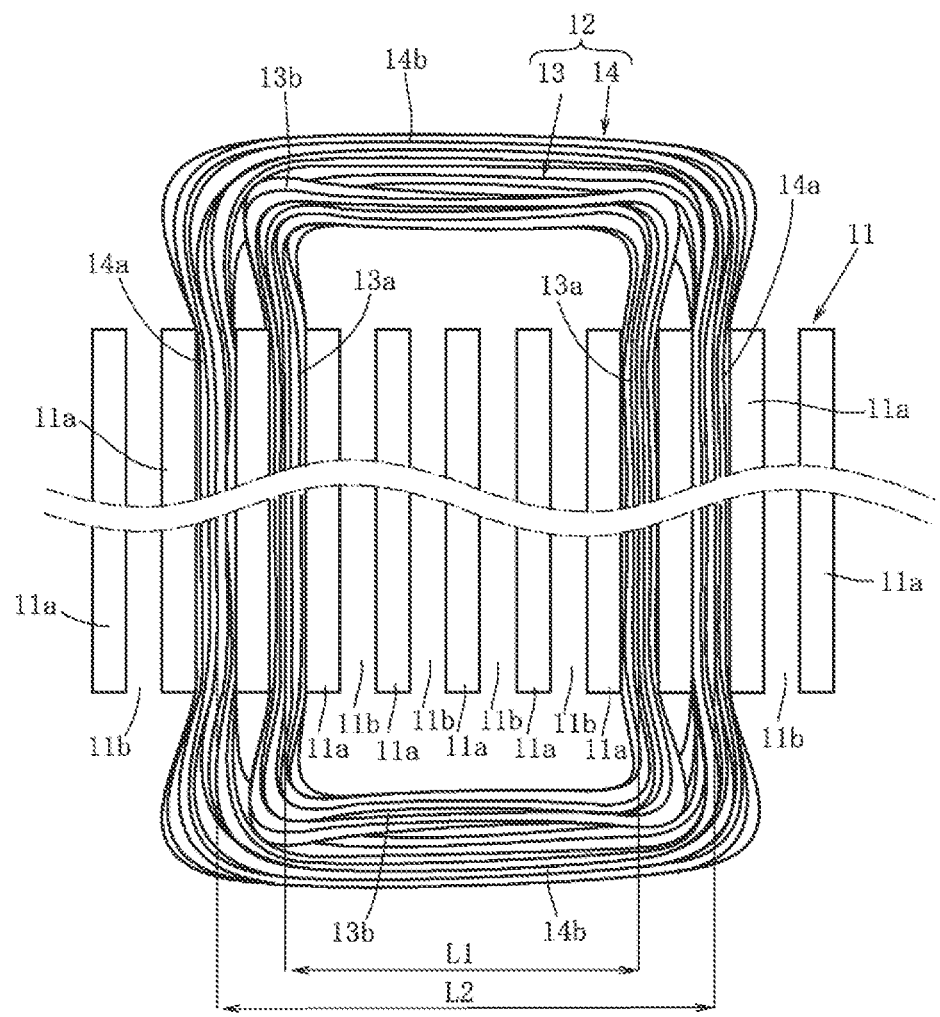
FIG. 12 is a diagram which showing a core from an inside of the slot, the core formed by the peripheral parts of the coil of a stator coil having the inner coil and the outer coil being inserted into several slots

This stator coil 12 forms one winding layer, as shown in FIG. 12, their peripheral parts of the coil 13a, 14a are inserted into two neighboring slots 11b, respectively. Thus, the stator coil 12 consists of large and small two neighboring coils 13, 14 which a distance L1, L2 between each peripheral parts of the coil 13a, 14a are different each other.

Returning to FIG. 2, the coil winding apparatus 20 for producing the stator coil 12 is an apparatus comprising a winding core 36, 37 which are rotated by the rotating mechanism 25, and producing the stator coil 12 (FIG. 12) by winding a wire core 16 to the wire rod 36, 37 rotated by the rotating mechanism 25.

The wire rod 16 in this embodiment is a coated lead wire, the cross-section is formed a circular, so-called round wire is used. Incidentally, the wire rod 16 may be a so-called square wire which cross-section is formed a square. Then, the wire rod 16 is fed out from the wire rod feeding member 31. The wire rod feeding member 31 in the present embodiment will be described as a member so as to feed out a plurality of wire rods 16 arranged in parallel.

Although not shown, the wire rod 16 is wound around the spool and stored in the spool. The wire rod 16 drawn from the spool is straightened by a stretcher, not shown, and subsequently guided to the wire rod feeding member 31. Since the wire rod feeding member 31 is configured to feed a plurality of the wire rods 16, a plurality of the wire rods 16 are wound and stored in a different spool respectively and the wire rod 16 fed from the different spools respectively and each wire rod 16 is straightened by the stretcher. And a plurality of straightened wire rods 16 are guided to the wire rod feeding member 31.

The wire rod feeding member 31 in the present embodiment is a rod-shaped member and is formed a hole, the hole having a rectangular or track-shaped cross section for passing in a plurality of the wire rods 16 in parallel. This wire rod feeding member 31 is attached to a lower table 23 via a wire rod feeding member moving mechanism 32 configured to move this wire rod feeding member 31 in the three axial directions freely.

The wire rod feeding member moving mechanism 32 in this embodiment is constituted by combining the X-axis telescopic actuator 33, Y-axis telescopic actuator 34 and Z-axis telescopic actuator 35. Each telescopic actuator 33 to 35 are provided with ball screws 33b to 35b which are pivotally driven by servo motors 33a to 35a, and follower 33c to 35c which are screwing into the ball screws 33b to 35b and moving to parallel.

The Z-axis telescopic actuator 35 is provided with a follower 35c, and the follower 35c is mounted movably in the Z-axis direction (vertical direction). The housing 35d of the Z-axis telescopic actuator 35 is mounted on a follower 33c provided with the telescopic actuator 33. The X-axis telescopic actuator 33 is provided with a follower 33c, and the follower 33c is mounted movably in the X-axis direction. The housing 33d of the X-axis telescopic actuator 33 is mounted on a follower 34c provided with the Y-axis telescopic actuator 34. The Y-axis telescopic actuator 34 is provided with a follower 34c, and the follower 34c is mounted movably in the Y-axis direction. And the housing 34d of the Y-axis telescopic actuator 34 extends in the Y-axis direction and is mounted on the lower table 23.

Then, the wire rod feeding member 31 is extending along X-axis direction, and mounted to the follower 35c provided with X-axis telescopic actuator 35.

In addition, although not shown, the wire rod feeding member 31 includes a clamping mechanism which clamps the wire rod 16 fed out of the wire rod feeding member 31.

On the other hand, the rotating mechanism 25 includes an electric motor 26 as a driving mechanism for rotating the winding cores 36, 37. The winding core is provided with an inner winding core 36 configured to obtain an inner coil 13 (FIG. 10) by the wire rod 16 which is rotated and wound by the rotating mechanism 25 and an outer winding core 37 configured to obtain an outer coil 14 (FIG. 11) by the wire rod 16 wound, the outer winding core 37 being surrounding the inner winding core 36, and rotating with the inner winding core 36.

Figure 1:
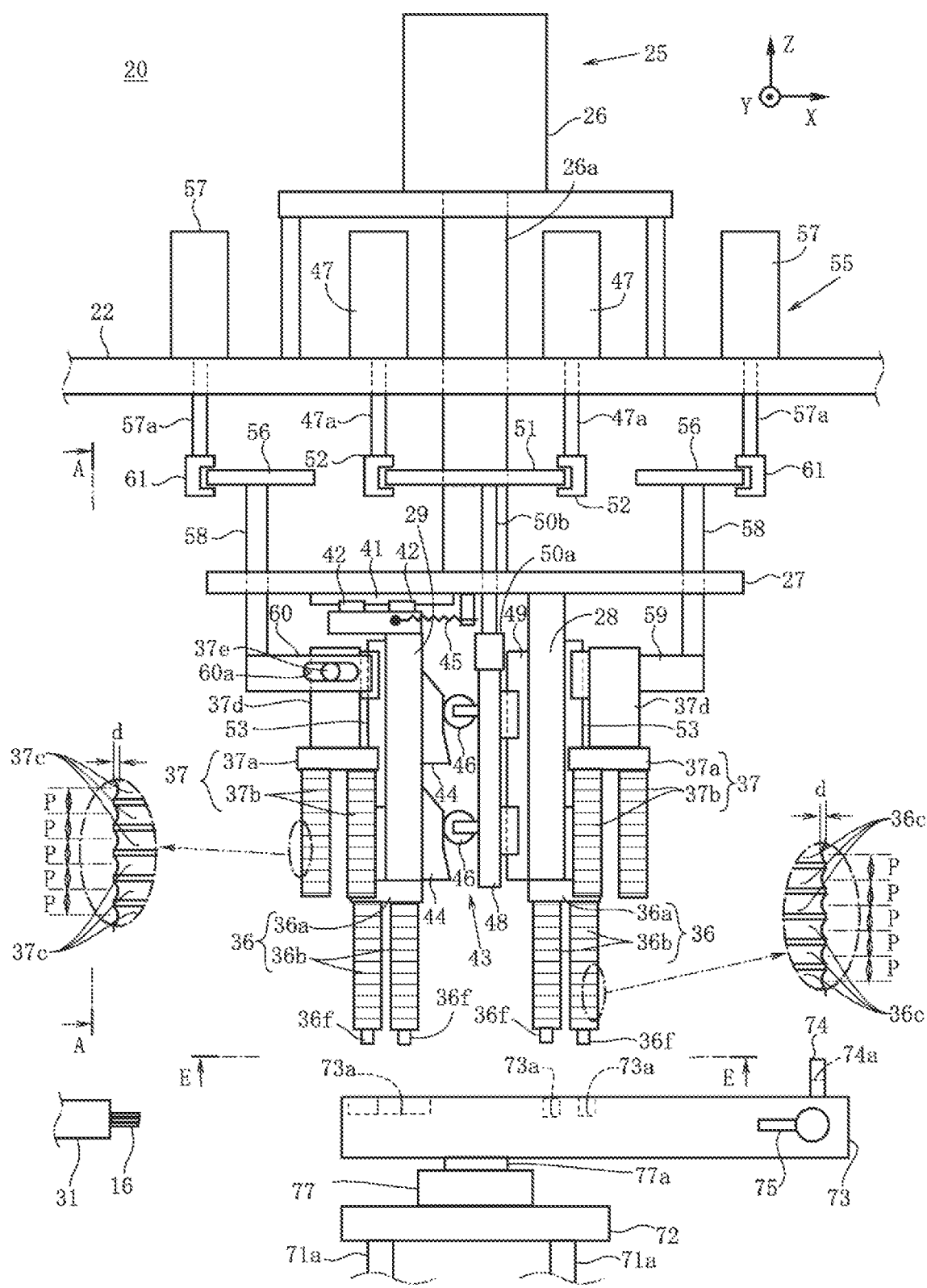
FIG. 1 is an enlarged view of a winding core member of a coil winding apparatus in the present embodiment.

As shown in detail in FIG. 1, the rotary mechanism 25 described in this embodiment is provided with a rotating plate 27 and a pair of columnar members 28, 29. The rotating plate 27 is mounted to a rotating shaft 26a of a motor 26 and rotating in a horizontal plane. A pair of the columnar members 28, 29 is erected downward on the rotating plate 27 to put the center of the rotating plate 27 (Hereafter, it may be referred to simply as the center of rotation). That is, the pair of columnar members 28, 29 is provided, the one columnar member 28 erected downward on the rotating plate 27 and arranged to a position biased (shifted) to the center of the rotation and the other columnar member 29 erected downward on the rotating plate 27 so as to put the center of rotation with the columnar member 28.

In the rotating plate 27, the other columnar member 29 is movably erected on a straight line passing through the rotational center of the rotating plate 27, i.e. radial direction of the rotating plate 27. The rotating plate 27 in this embodiment forms a disc shape, the center of the horizontal condition is attached to the rotary shaft 26a of the electric motor 26.

The one columnar member 28 is erected on the rotating plate 27 by biased (shifting) from the rotational center. On the opposite side of the one columnar member 28 with respect to the center of rotation, a rail 41 is mounted, the rail 41 being extending on the straight line passing through both the one columnar member 28 and the center of rotation, that is, along a diametrical direction passing through the one columnar member 28.

On the other hand, an upper portion of the other columnar member 29, the movable block 42 which is reciprocally in the longitudinal direction of the rail 41 is engaged with the rail 41 is mounted. Then, by movably engaging the moving block 42 to the rail 41, the other columnar member 29 is erected movably in the radial direction of the rotating plate 27.

Figure 3:
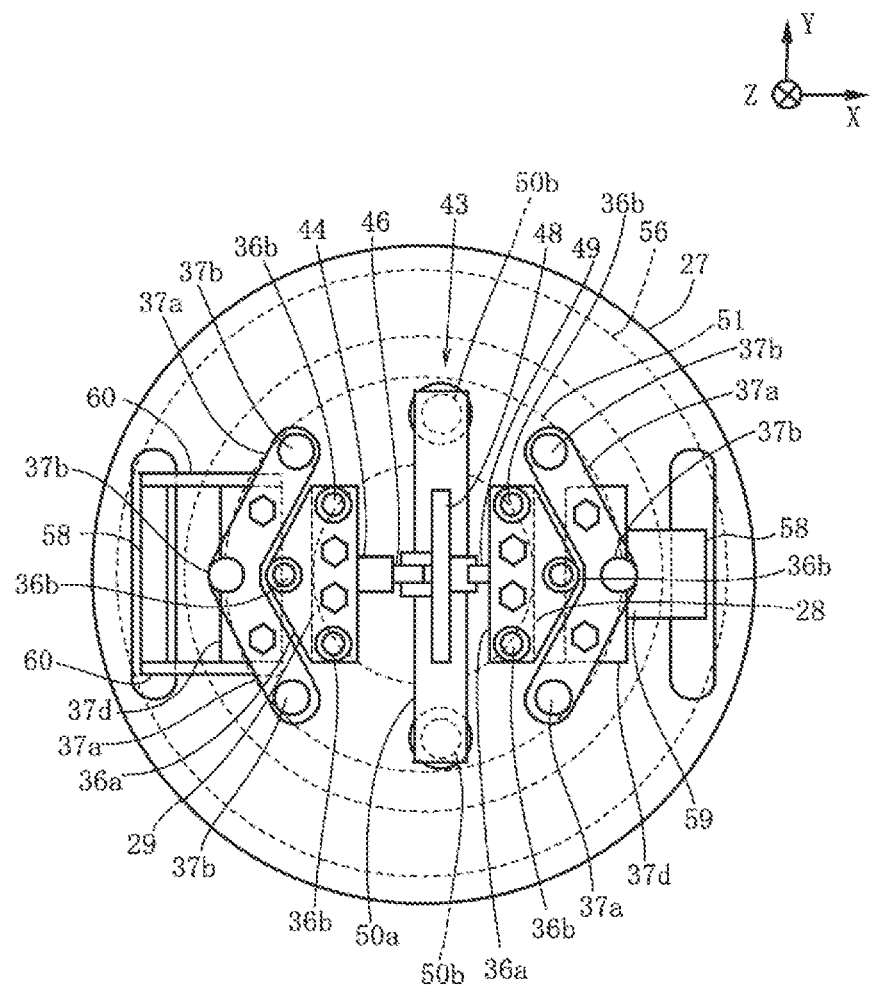
FIG. 3 is a sectional view taken along line E-E of FIG. 1.

As shown in FIG. 1 and FIG. 3, the coil winding apparatus 20 is provided with a holding mechanism 43 that maintains one columnar member 28 and the other columnar member 29 and spacing at a predetermined value. The holding mechanism 43 in the present embodiment includes a plate cam 44 provided on the other columnar member 29, a roller 46 as a contactor provided vertically movable on the one columnar member 28, a coil spring 45 as a biasing mechanism for contacting the plate cam 44 to the roller 46 by biasing in a direction close to the one columnar member 28, and a hydraulic cylinder 47 provided on an upper table 22 and as an actuator for vertically moving the roller 46.

That is, the plate cam 44 is provided extending vertically on the surface facing the one columnar member 28 of the other columnar member 29. The roller 46 in contact with the plate cam 44 is pivotally supported by the movable platform 48. The rail 49 is provided vertically on the surface facing the plate cam 44 of the one columnar member 28. The movable platform 48 is provided vertically movable to the rail 49.

A cross member 50a extending diametrically of rotating plate 27 is provided on the upper end of the movable platform 48. The both ends of the cross member 50a is attached to the lower end of a vertical member 50b which penetrates rotating plate 27 movably. On the upper end of the vertical member 50b protruding above rotating plate 27, the first disc 51 of the doughnut-shaped surrounding the rotary shaft 26a (annular) is mounted so as to be coaxial with the rotary shaft 26a.

As shown in FIG. 1, on an upper surface of the upper table 22, the hydraulic cylinder 47 as an actuator is provided with its retracting rod 47a downward. A lower end of the retractable rod 47a, the engaging member 52 for engaging the periphery of the first disc 51 is provided. Then, when the hydraulic cylinder 47 retract the retractable rod 47a, the donut-shaped first disc 51 is lifting and descending with the movable platform 48 and the roller 46 through an engaging member 52 provided at lower end of the retractable rod 47a. Then, the other columnar member 29 is moved diametrically of the rotating plate 27 according to the inclined surface of the plate cam 44 to which the roller 46 contacts.

Therefore, when the hydraulic cylinder 47 as an actuator retract the retractable rod 47a, the distance between the one columnar member 28 and the other columnar member 29 is changed. When stopping the lifting and descending of the first disc 51 or the like, the movement of the other columnar member 29 is stopped, and distance between the pair of columnar members 28, 29 be able to keep at a predetermined value.

Further, the engaging member 52 is engaged with the periphery of the doughnut-shaped first disc 51 and prohibit the independent lifting and descending of the first disc 51. Further, the engaging member 52 is configured to allow rotation of the first disc 51. Specifically, the engaging member 52 is configured to allow the rotating plate 27 to rotate with the first disc 51.

As shown in FIG. 1 to FIG. 4, the inner winding core 36 is mounted on the lower end of the pair of columnar members 28, 29. The inner winding core 36 is provided with an inner base plate 36a mounted so as to be horizontally to the lower end of the pair of columnar members 28, 29 and a plurality of inner winding pins 36b erected on the inner base plate 36a, forming the inner coil 13 (FIG. 10) by wound wire rod 16.

The plurality of inner winding pins 36b are provided so as to protrude downward from the lower surface of the inner base plate 36a, and erected along the inner periphery of inner coil 13 to be formed in the inner base plate 36a. In the present embodiment, there is shown that each of the three inner winding pins 36b are erected in a pair of the inner base plates 36a, and these six inner winding pins 36b are erected along the inner periphery of the hexagonal-shaped inner coil 13 to be obtained (FIG. 10).

Figure 10:
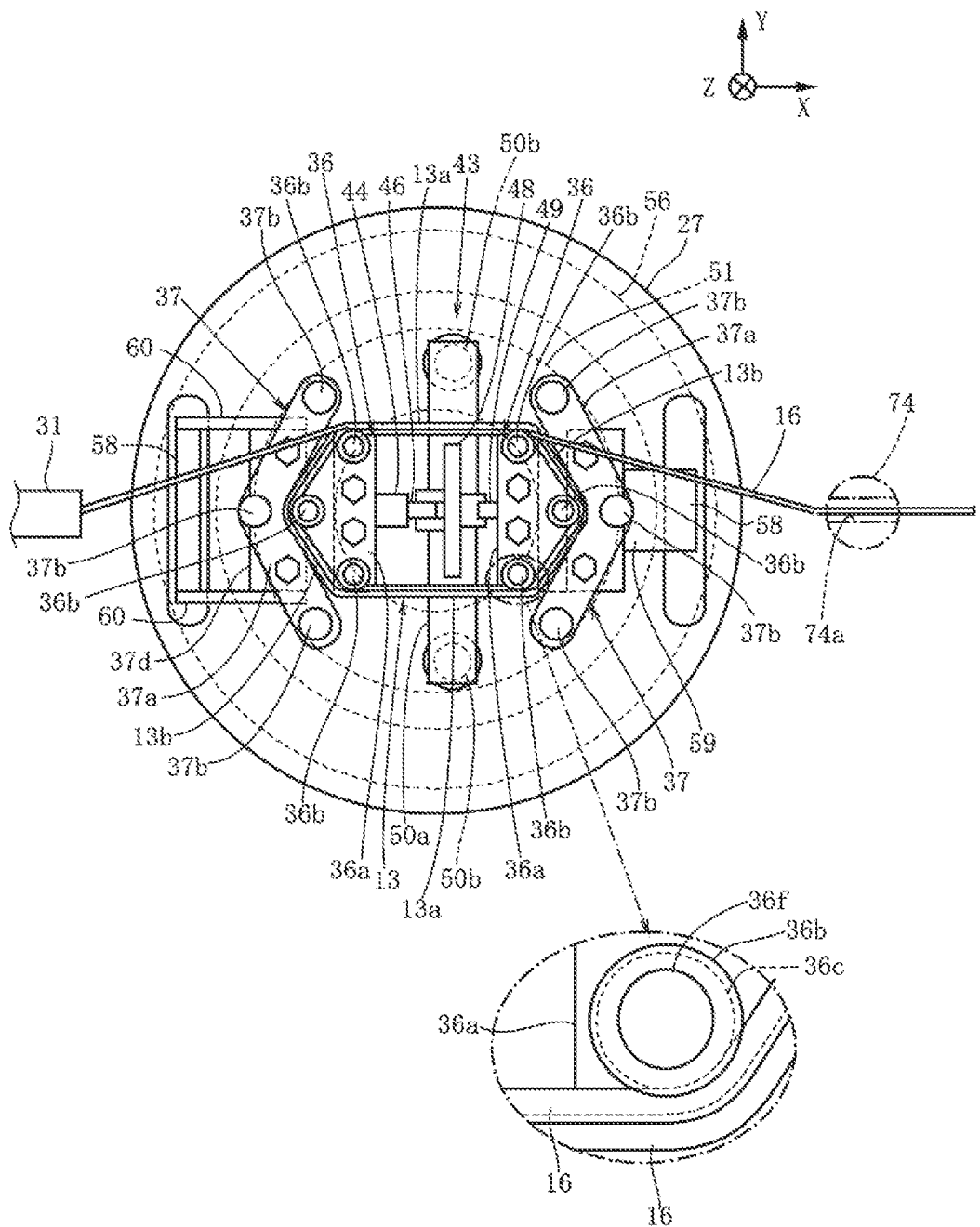
FIG. 10 is a sectional view taken along line C-C of FIG. 8.

Therefore, by rotating the one columnar member 28 and the other columnar member 29 with the inner winding core 36, when winding the wire rod 16 to a plurality (six) of the inner winding pins 36b, as shown in FIG. 10, the wire rod 16 is refracted by being wound on the respective inner winding pins 36b at the lower end of one columnar member 28 and the other columnar member 29 to form a coil end portion 13b. Thereafter, the wire rod 16 spanned between the one columnar member 28 and the other columnar member 29 forms the inner coil 13 constituting peripheral parts of the coil 13a.

Then, as shown in FIG. 1, on the outer periphery of the plurality of inner winding pins 36b, circumferential groove 36c is formed respectively, the circumferential groove 36c have a cross-section corresponding to the cross-sectional shape of the wire rod 16 to be wound, and are configured to put the wire rod 16 respectively.

Figure 8:
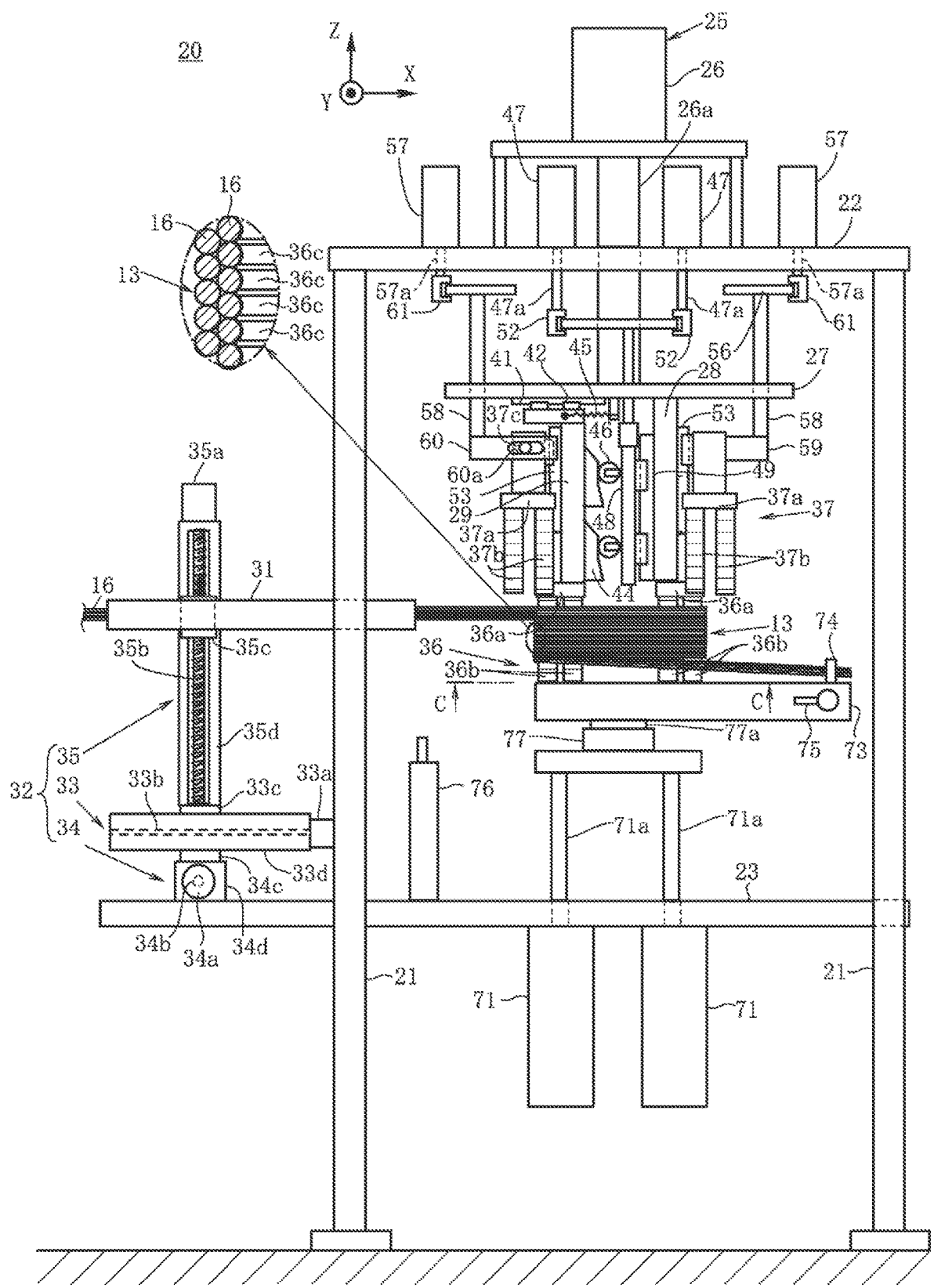
FIG. 8 is a diagram corresponding to FIG. 2 showing a condition in which the wire rod is wound on the inner winding pin and an inner coil is produced.

Specifically, this circumferential groove 36c is a groove in which the wire rod 16 having the circular cross section constituting the inner coil 13 is put. The cross-section of the circumferential groove 36c forms an arc shape corresponding to the cross-sectional radius of the wire rod 16, and the depth d of the circumferential groove 36c is formed below the cross-sectional radius of the wire rod 16. These circumferential grooves 36c are continuously formed at a pitch P corresponding to the outer diameter of the wire rod 16 spanned on the inner winding pin 36b along the extending direction of the inner winding pin 36b (longitudinal direction). When a plurality of the wire rods 16 spanned on these inner winding pins 36b put into their circumferential grooves 36c respectively, the wire rods 16 are formed so as to be aligned in close contact with each other (FIG. 8).

As shown in FIG. 1 to FIG. 4, the outer winding core 37 for producing the outer coil 14 (FIG. 11 and FIG. 12) is provided with an outer base plate 37a having an outer periphery larger than the outer periphery of the inner base plate 36a and a plurality of outer winding pins 37b erected on the outer base plate 37a having an outer periphery larger than the outer periphery of the inner base plate 36a, forming the inner coil 13 by wound wire rod 16 to the plurality of outer winding pins 37b.

As shown in FIG. 1, in this embodiment, the outer winding core 37 is movably provided on the pair of columnar members 28, 29. The pair of columnar members 28, 29 are respectively provided with rails 53 extending vertically parallel to the rotating shaft of the rotating plate 27. The base plate 37a is mounted to the movable body 37d which is mounted so as to be movable lifting and descending to the rail 41. The outer winding pins 37b protrudes downward from the lower surface of the outer base plate 37a and are erected along the inner surface of the outer coil 14 (FIG. 11) which is to be produced on the outer base plate 37a.

Figure 4:
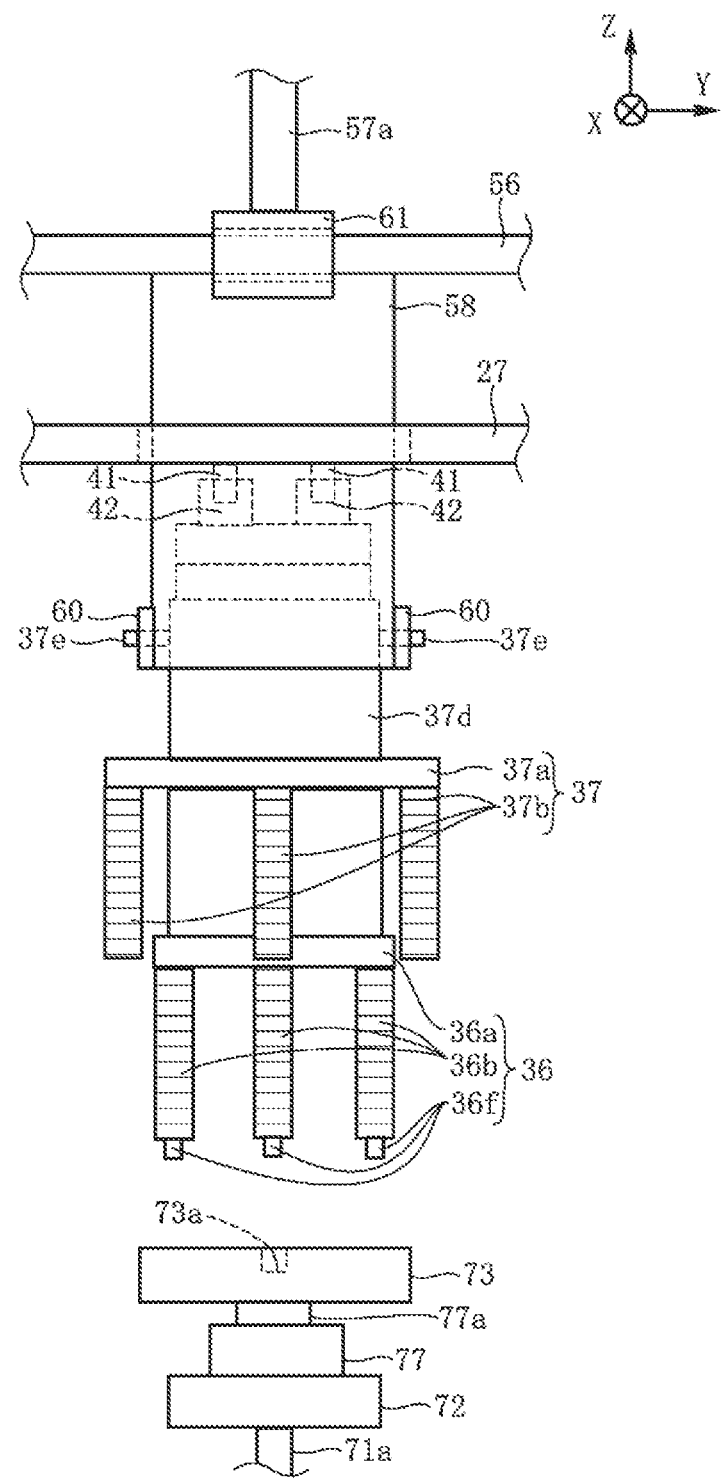
FIG. 4 is a sectional view taken along line A-A of FIG. 1.
Figure 5:
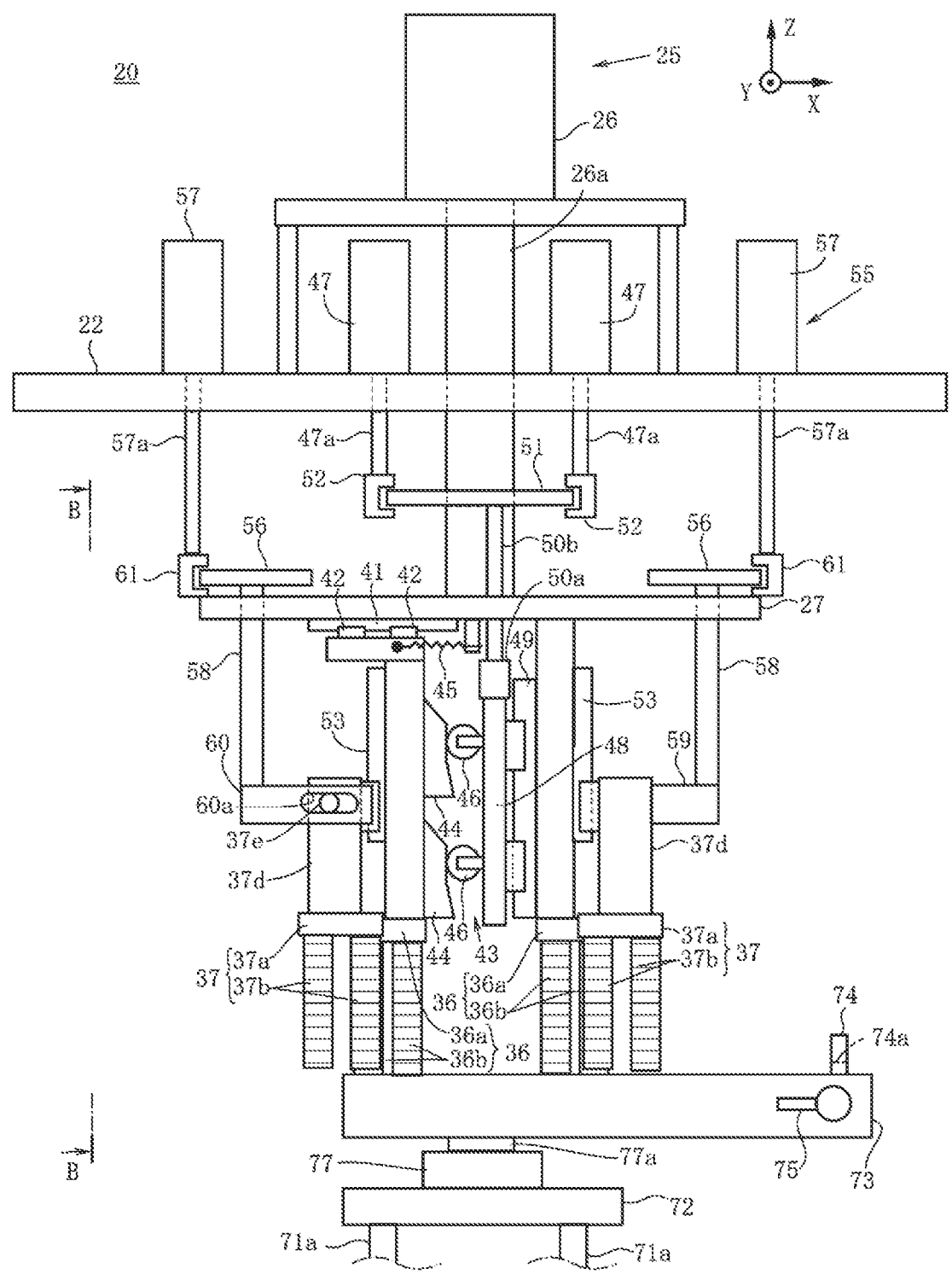
FIG. 5 is a diagram corresponding to FIG. 1 showing a condition in which an outer winding pin surrounds an inner winding pin.
Figure 6:
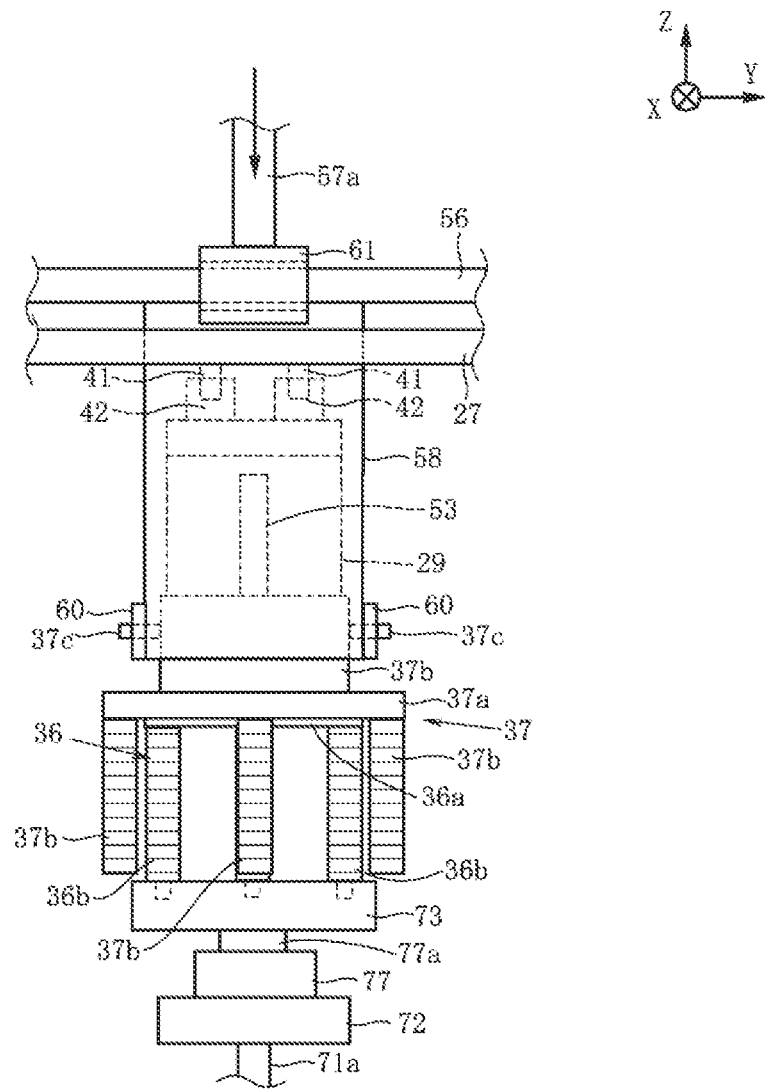
FIG. 6 is a sectional view taken along line B-B of FIG. 5.

A plurality of these outer winding pins 37b moves lifting and descending with the outer base plate 37a. As shown in FIG. 5 and FIG. 6, in the state that the outer base plate 37a and the outer winding pins 37 are descended, the outer winding pin 37b erected on the outer base plate 37a reaches to a winding position in which is the outer winding pins 37 spread over the outer periphery of the inner winding pins 36b erected on the inner base plate 36a. That is, when the outer winding pin 37b is positioned in the winding position, the outer winding pin 37b overlaps the inner winding pin 36b along the direction of the rotating axis of the rotating plate 27. As shown in FIG. 1 and FIG. 4, in the state that the outer winding pins 37 are lifted, the outer winding pins 37 shifts from the inner winding pin 36b erected on the inner base plate 36a to the direction of the rotational axis of the rotating plate 27, reaches to a standby position that an outer periphery of the inner winding core 36 is exposed. That is, when the outer winding pin 37b moves to the standby position, the outer winding pin 37 does not overlap the inner winding pin 36b along the direction of the rotating axis of the rotating plate 27.

As shown in FIG. 1, the coil winding apparatus 20 is provided with an outer winding core moving mechanism 55 for reciprocating this outer winding core 37 (specifically, the outer base plate 37a) between the winding position and the standby position. The outer winding core moving mechanism 55 is provided with a doughnut-shaped (annular) second disc 56 positioned above the rotating plate 27 and connected to the outer winding core 37, and a hydraulic cylinder 57 as an actuator provided with the retractable rods 57a downwardly on the upper surface of the upper table 22.

A pair of elevating rods 58 extending vertically are mounted through an outside of the radius of the rotating plate 27 than the position of the outer winding pin 37 at the rotating plate 27. A lower end of the one of elevating rods 58 is mounted the one movable member 37d via a connecting horizontal rod 59.

As shown in FIG. 1 to FIG. 4, on a lower end of the other elevating rod 58, a pair of clamping plates 60 for clamping the other movable member 37d from the rotational direction of the rotating plate 27 is mounted. In a pair of clamping plates 60, elongated holes 60a extending the radial direction of the rotating plate 27 (FIG. 1) are respectively formed. The other movable member 37d is provided with a round pin 37e which can insert into the elongated hole 60a. The outer winding core 37 including the other movable member 37d is prohibited from being lifted and descended independently of a pair of clamping plates 60. This outer winding core 37 is allowed to move with the other columnar member 29 to the rotational radial direction of the rotating plate 27.

The upper end of a pair of lifting rods 58 is mounted the doughnut-shaped second disc 56 which coaxially surrounds the rotating shaft 26a and the doughnut-shaped first disc 51, in the lower end of the retracting rod 57a of the hydraulic cylinder 57, an engagement member 61 for engaging the periphery of the second disc 56 is provided.

Then, when the hydraulic cylinder 57 is retracted the retractable rod 57a, the second disc 56 is retracted with outer winding core 37 through the engaging member 61 provided at lower end of the retractable rod 57a, and the outer winding core 37 can reciprocate between the winding position shown in FIG. 5 and the standby position shown in FIG. 1

Further, the engaging member 61 is engaged with the periphery of the doughnut-shaped second disc 56 and regulating the independent elevation of the second disc 56, but allowing the rotation of the second disc 56. And rotation of the rotating plate 27 together with the second disc 56 is allowed.

Figure 9:
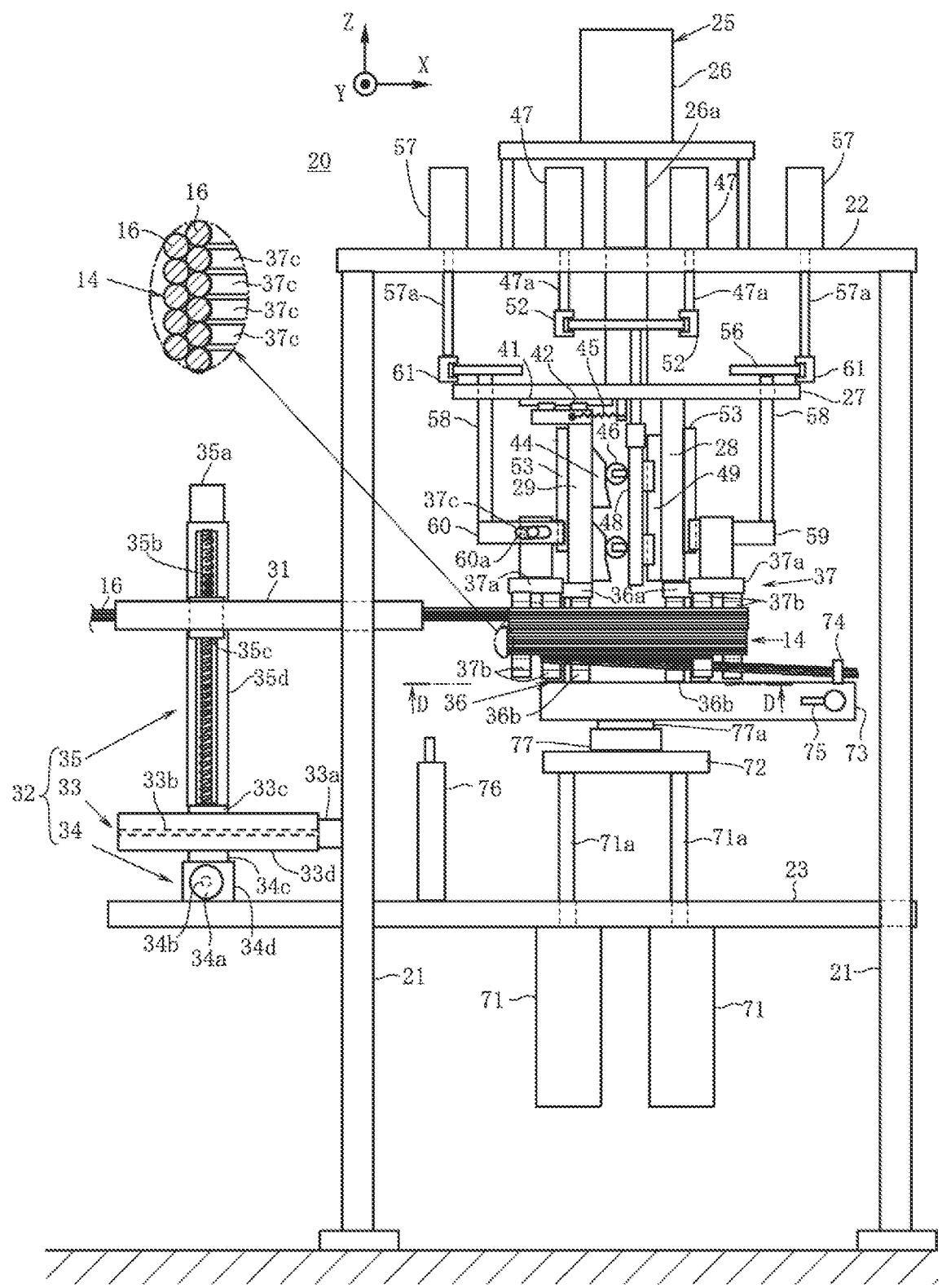
FIG. 9 is a diagram corresponding to FIG. 2 showing a condition in which the wire rod is wound on the outer winding pin and an outer coil is produced.

Therefore, as shown in FIG. 9, the outer winding core 37 in the winding position, when the electric motor 26 as a rotary mechanism 25 is driven and the rotating plate 27 rotates, the pair of columnar members 28, 29 erected on the rotating plate 27 rotates together with the rotating plate 27, the wire rod 16 is wound in the outer winding pin 37b at the outer winding core 37.

Here, the outer winding pin 37b is erected along the inner periphery of the outer coil 14 to be produced in the outer base plate 37a exceeding the outer periphery of the inner base plate 36a. In this embodiment, three outer winding pin 37b are erected in a pair of the outer base plates 37a respectively. These six outer winding pin 37b in total are erected along the inner circumference of the hexagonal-shaped outer coil 14 (FIG. 11) to be produced.

Figure 11:
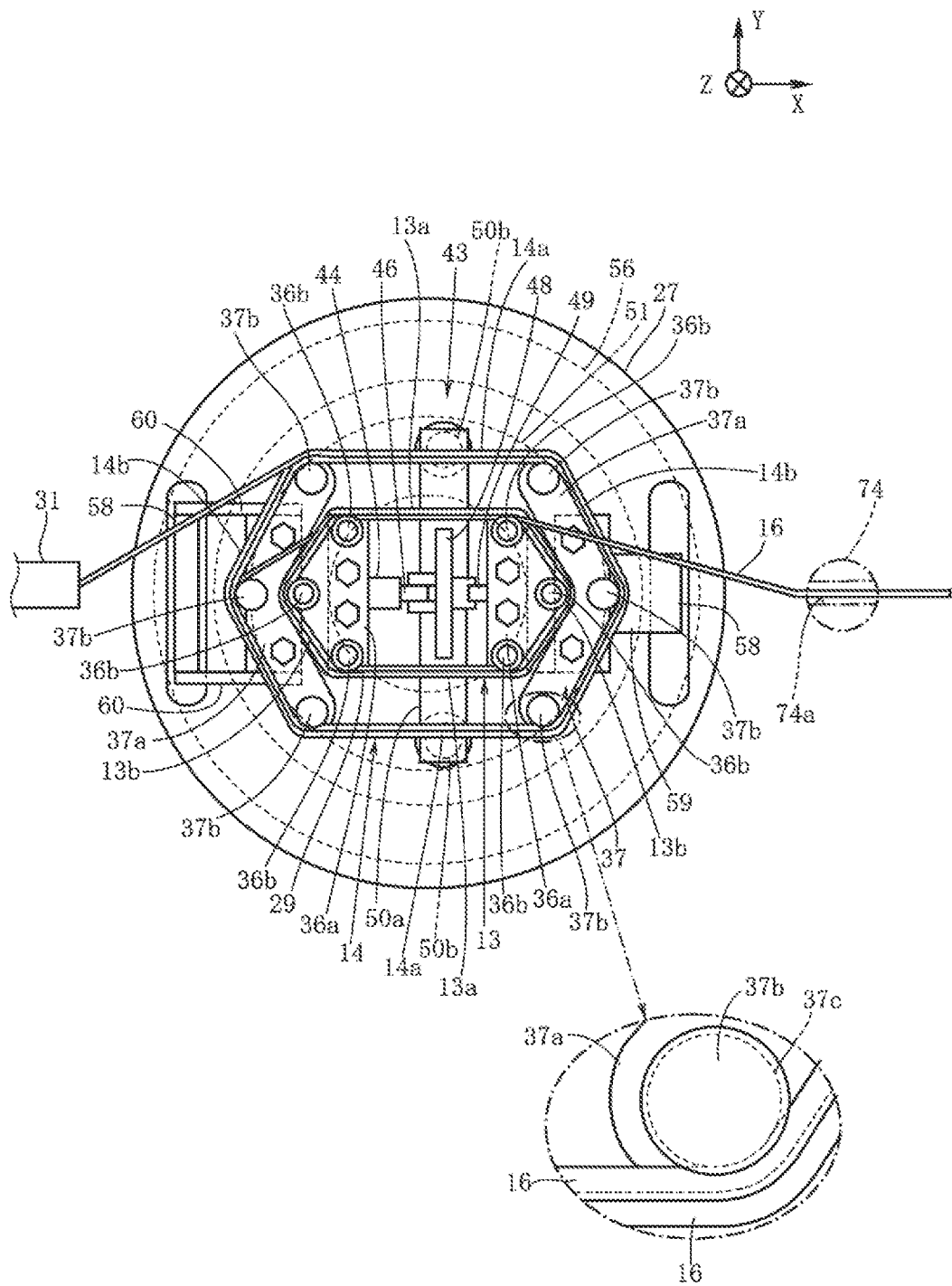
FIG. 11 is a sectional view taken along line D-D of FIG. 9.

Therefore, as shown in FIG. 11, when the outer winding core 37 is winding the wire rod 16 to a plurality (six) of the outer winding pins 37b in the winding position, the wire rod 16 refracted by winding to the outer winding pin 37b in the outer base plate 37a is formed a coil end portion 14b.

Then, as shown in FIG. 1, on the outer periphery of the plurality of outer winding pins 37b, circumferential grooves 37c into which are put the wire rod 16, the wire rod 16 having a cross-section corresponding to the shape of cross-section of the wire rod 16 to be wound, is formed.

That is, the circumferential groove 37c is a groove for putting the wire rod 16 having a round-shaped cross-section and constituting the outer coil 14. The cross-section of circumferential groove 37c forms an arc with a radius corresponding to the radius of the cross-section of the wire rod 16, and the depth d of the circumferential groove 37c is formed less than the length of the radius of the cross-section of the wire rod 16. A plurality of the circumferential grooves 37c is formed continuously along the direction of extension of the outer winding pin 37b (longitudinal direction) at a pitch P corresponding to an outer diameter of the wire rod 16 to be wound around the outer winding pin 37b. A plurality of the wire rods 16 that are wound to the outer winding pin 37b are formed so that they are closely contact and aligned with each other when putting into the circumferential groove 37c (FIG. 9).

Here, the inner winding pin 36b and the outer winding pin 37b is a pin-like body having a round-shaped cross-section. The forming the circumferential grooves 36c, 37c on the outer periphery of the pin-like body having the round-shapes cross-section is easy as compared with the case of forming a groove in a winding core of a drum member matched with an inner shape of a conventional winding core. For this reason, by using the inner winding pin 36b and the outer winding pin 37b that the outer periphery of the pin-like body is formed the circumferential grooves 36c, 37c, a unit price of the winding cores 36, 37 becomes never higher.

Further, when the wire rod 16 is put into those circumferential grooves 36c, 37c, The configuration such as a flange which has been conventionally used to limit the shifting the wire rod 16 wound to the inner winding pin 36b and the outer winding pin 37b to the longitudinal direction is unnecessary because the wire rod 16 is not shifted to the longitudinal direction of the inner winding pin 36b and the outer winding pin 37b. In this way, the number of parts can be reduced, make it possible to obtain a relatively inexpensive coil winding apparatus 20.

As shown in FIG. 2, the lower table 23 and the upper table 22 are provided on a strut 21 so as to sandwich the inner winding core 36 and the outer winding core 37 from top and bottom. The lower table 23 is provided with the hydraulic cylinder 71 which faces the retractable shaft 71a upward. A mounting base 72 is attached to the upper end of the retractable shaft 71a of the hydraulic cylinder 71. The mounting base 72 is provided with an electric motor 77 which faces a rotation shaft 77a upward.

The electric motor 77 is mounted to the mounting base 72 so as to be coaxial the rotating shaft 77a of the electric motor 77 with the rotating shaft 26a of the electric motor 26 constituting the rotation mechanism 25. The rotating shaft 77a is provided with a rotating table 73 is mounted so as to rotate in a horizontal plane. Then, the rotating table 73 is provided with a wire rod clip 74 for clipping the end of the wire rod 16 fed out from the wire rod feeding member 31.

The wire rod clip 74 is provided to the upper surface near the outer periphery of the rotary table 73. A slit 74a in which the wire rod 16 can enter from upper side is formed in the wire rod clip 74. The slit 74a is formed as opening in the upper end. The slit 74a incorporates a holding member (not shown) for holding the wire rod 16 entered.

The wire rod clip 74 is provided with an operating lever 75 for operating the holding member so as to change a holding state that the entered wire rod 16 into the slit 74a is held, or a releasing state that the entered wire rod 16 into the slit 74a is released not be holding. Then, in the lower table 23, an actuator 76 for operating the operation lever 75 is provided.

On the other hand, the hydraulic cylinder 71 constitutes a table moving mechanism at a point of being able to lifting and descending the rotation table 73 in the Z-axis direction. The hydraulic cylinder 71 as the table moving mechanism, as shown in FIG. 5, is configured to raise and lower the rotary table 73 between a proximity position and a separating position, the proximity position is a position where the upper surface comes into contact with or approaches the lower end of the inner winding pin 36b in the inner winding core 36 when the rotating table 73 is raised, the separating position is a position which creates a gap between the lower end of the inner winding pin 36b and the lower end of the rotary table 73 when the rotating table 73 is lowered.

A protrusion 36f protruding downward is formed on the lower surface of the inner winding pin 36b. On the upper surface of the rotating table 73, a hole 73a is formed in which the protrusion 36f is able to be inserted. Therefore, as shown in FIG. 5, when the rotating table 73 is in the proximity position, the protrusion 36f is inserted into the hole 73a, and the rotation of the rotary table 73 independent of inner winding pin 36b is prohibited, the rotating table 73 rotates with the rotation of the inner winding core 36 and the outer winding core 37.

Then, the electric motor 26 in the rotating mechanism 25 is configured to rotate the inner winding core 36 and the outer winding core 37. The electric motor 77 in the lower table 23 is configured to rotate the rotating table 73 provided with such the wire rod clip 74 with the inner winding pin 36b and the outer winding pin 37 synchronously. Thus, the wire rod 16 fed from the wire rod feeding member 31 can be wound around the winding pin 36b, 37b formed in the inner winding core 36 and the outer winding core 37 respectively.

On the other hand, the wire rod feeding member moving mechanism 32 is configured to move the wire rod feeding member 31 to axially of rotating plate 27 with the rotation of the inner winding core 36 and the outer winding core 37 revolutions. Thus, a plurality of the wire rods 16 fed out from the wire rod feeding member 31 can be wound spirally aligned to the winding pin 36b, 37b formed in the inner winding core 36 and the outer winding core 37 respectively.

Next, a coil winding method according to the present invention will be described.

The coil winding method according to the present invention is a method for making the coil 13, 14 by rotating the winding core 36, 37, winding the wire rod 16 to the winding core 36, 37. This coil winding method is a method that includes by using the winding core 36, 37 with the plurality of winding pins 36b, 37b erected on the base plates 36a, 37a along the inner circumference of the coils 13, 14 that should be obtained, forming the circumferential grooves 36c and 37c into which the wire rod 16 put the circumference of the plurality of winding pins 36b and 37b, respectively, winding the wire rod 16 around the plurality of winding pins 36b and 37b so as to suspend between the winding pins 36b and 37b, and putting the wire rod 16 wound around at least the plurality of winding pins 36b, 37b into the circumferential grooves 36c, 37c and the wire rod 16 is wound in regular winding.

As shown in FIG. 12, in the case of producing a stator coil 12 having the inner coil 13 and the outer coil 14 formed in succession with the inner coil 13, it needs an inner winding process that the inner coil 13 is produced by above coil winding method, and an outer winding process performed after the inner winding process that the outer coil 14 is produced by above coil winding method again.

More specifically, when the above-mentioned coil winding apparatus 20 is used, the coil manufacturing method using the above-mentioned coil winding method is a method that includes an inner winding process, an enclosing process and an outer winding process, and the inner winding process is a process in which the wire rod 16 is wound around the plurality of inner winding pins 36*b* using the coil winding method described above to produce the inner coils 13, the inner winding core 36 is equipped with the inner base plate 36*a* and the plurality of inner winding pins 36*b* erected on the inner base plate 36*a*, is used to form circumferential groove 36*c* into which the wire rod 16 put the periphery of the plurality of inner winding pins 36*b*, the enclosing process is a process that surrounds the inner coil 13 with a number of the outer winding pins 37*b*, the outer base plate 37*a* has a larger periphery than the outer periphery of the inner base plate 36*a*, and the wire rod 16 put into the outer circumference of the outer base plate 37*a*, which is erected on the outer base plate 37*a* that exceeds the outer circumference of the inner base plate 36*a*, using the outer winding core 37 with the plurality of outer winding pins 37*b* formed with the circumferential groove 37*c*, in the outer winding process to produce the outer coil 14, using the coil winding method described above, the outer base plate 37*a* is rotated together with the inner base plate 36*a*, and the wire rod 16 is wound around the plurality of outer winding pins 37*b* to produce an outer coil 14.

In the present embodiment, the operation in the above coil winding apparatus 20 is assumed to be automatically controlled by a controller (not shown), it will be described in detail below the respective steps.

<Inner Winding Process>

In this inner winding process, the inner winding core 36 with the inner base plate 36*a* and the plurality of inner winding pins 36*b* erected on the inner base plate 36*a* is used. When the inner winding core 36 is rotated by the rotation mechanism 25, the wire rod 16, which is fed from the wire rod feeding member 31, is wound around the periphery of the plurality of inner winding pins 36*b* in the inner winding core 36. The inner coil 13 is made by this process. For this purpose, the wire rod 16 is first fed from the wire rod feeding member 31.

Specifically, the wire rod 16 wound and stored on a spool not shown in the illustration is prepared, and the wire rod 16 is drawn from the spool. The drawn wire rod 16 is then inserted into the wire rod feeding member 31 by a stretching machine not described, and the wire rod 16 is clamped by an undescribed clamping mechanism.

Figure 7:
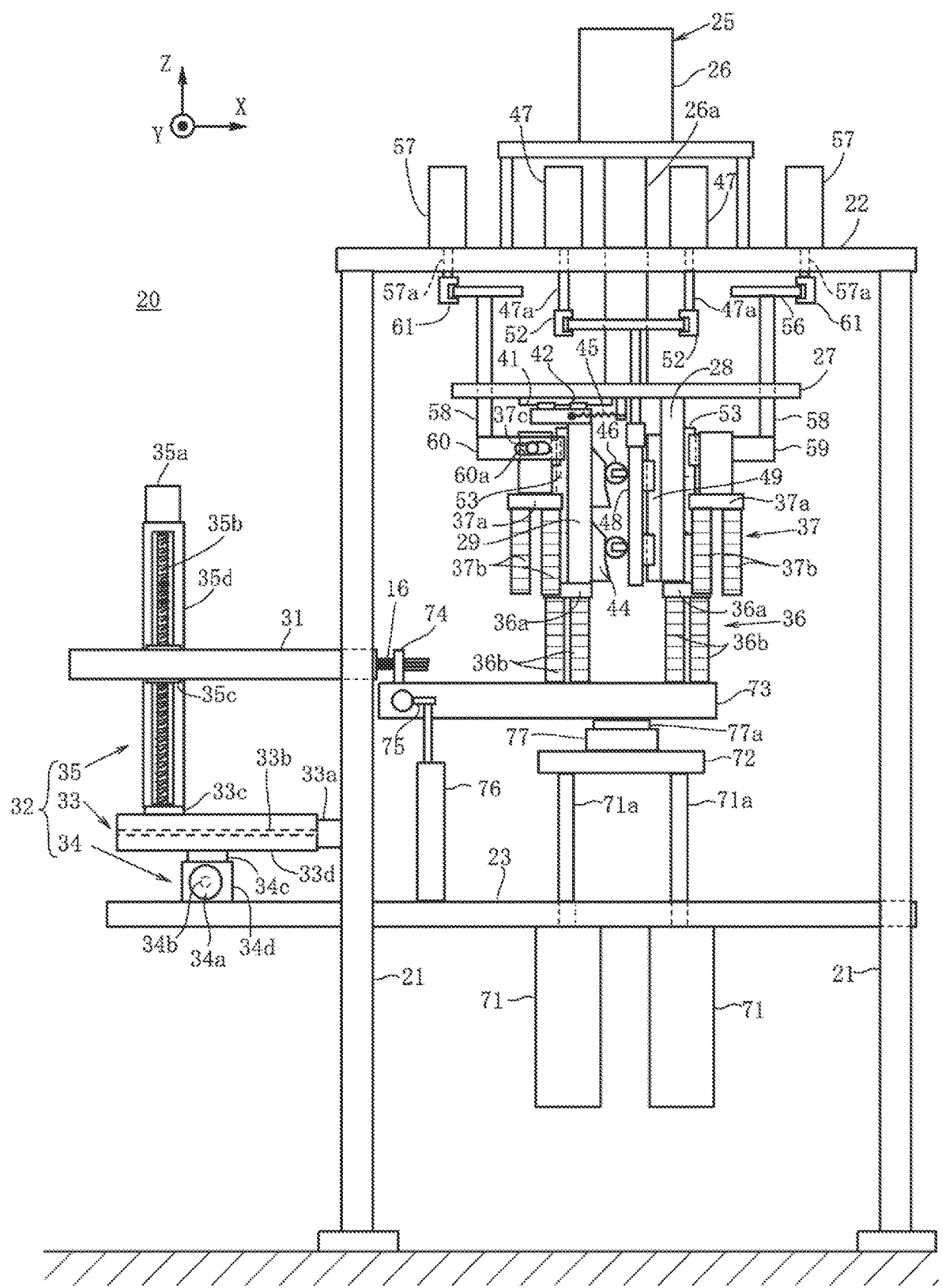
FIG. 7 is a diagram corresponding to FIG. 2 showing a condition at the beginning of winding in which the end of a wire rod is clamped by a wire rod clip.

As shown in FIG. 7, the electric motor 77 provided in the lower table 23 rotates the rotary table 73 to make the wire rod clip 74 mounted near the outer circumference of the rotary table 73 confront the wire rod feeding member 31. Then the wire rod feeding member moving mechanism 32 moves the wire rod feeding member 31 to insert the end of the wire rod 16 protruding from the wire rod feeding member 31 to the slit 74*a* (FIG. 10) formed in the wire rod clip 74. The end of the wire rod 16 is held by an undescribed holding member.

On the other hand, the holding mechanism 43 changes the spacing between the one columnar member 28 and the other columnar member 29 by retracting the retracting rod 47*a* of the hydraulic cylinder 47 as an actuator. Then, the holding mechanism 43 stops the raising and lowering of the hydraulic cylinder 47 at the desired spacing, and holds the spacing of the pair of columnar members 28, 29 at a predetermined value.

Further, the hydraulic cylinder 71 raises the rotating table 73. Then, as shown in FIG. 5, the protrusion 36*f* formed on the lower end surface of the plurality of inner winding pins 36*b* in the inner winding core 36 insert into the holes 73*a* formed in the upper surface of the rotating table 73, and the rotation of the rotary table 73 independent of inner winding core 36 is prohibited.

Additionally, the outer winding core moving mechanism 55 rises the outer winding core 37 by retracting the retractable rod 57*a* in the hydraulic cylinder 57 and keep the outer winding core 37 in the standby position that an outer periphery of the inner winding pin 36*b* is exposed.

Thereafter, the clamping mechanism of the wire rod feeding member 31 releases a clamping of the wire rod 16, and the electric motor 26 in the rotation mechanism 25 is driven to turn the inner winding core 36 together with the rotating plate 27 for a predetermined number of rotations. At the same time, the electric motor 77 installed in the lower table 23 is driven, and the rotation table 73 provided with the wire rod clip 74 which holds the end of the wire rod 16 is rotated a predetermined number of times in the same direction and at the same speed in synchronization with the inner winding core 36.

As shown in FIG. 8, herewith, the wire rod 16, which is fed out from the wire rod feeding member 31, is wound around the inner winding core 36 for a predetermined number of times. In fact, in the inner winding pin 36*b* on which the wire rod 16 is wound, the circumferential groove 36*c* into which put the wire rod 16 is formed. Therefore, as shown in the enlarged view thereof, when the wire rod 16 is wound up, the wire rod feeding member moving mechanism 32 arranges moving of the wire rod feeding member 31 so that the wire rod 16 fed out from the wire rod feeding member 31 put into the prescribed circumferential groove 36*c* in the inner winding pin 36*b*.

In this manner, the wire rod feeding member moving mechanism 32 moves the wire rod feeding member 31 in the axial direction of the rotating plate 27 with the rotation of the inner winding core 36. The wire rod 16, which is fed out from the wire rod feeding member 31, is then wound around the plurality of inner winding pins 36*b* in a spiral pattern while putting into a predetermined circumferential groove 36*c*. This constitutes a regular winding such that adjacent wire rods 16 are parallel to each other and in close contact. Then, after the first layer of coils consisting of the wire rod 16 wound directly on the inner winding pin 36*b* has been formed, the wire rod 16 is further wound in regular winding over it to make the second and subsequent layers of coils, if necessary.

In this way, as shown in FIG. 10, in this inner winding process, a polygonal-shaped inner coil 13 is produced, the inner coil 13 having a coil end portion 13*b* made of the wire rod 16 wound on the inner winding pin 36*b* erected on the inner base plate 36*a*, and a peripheral parts of the coil 13*a* made of the wire rod 16 wound between the pair of columnar members 28, 29.

Here, the circumferential groove 36*c* formed on the outer periphery of the inner winding pin 36*b*, as shown in FIG. 10, the longitudinal direction of the circumferential groove 36*c* is formed by curving along the outer periphery of the inner winding pin 36*b*. Therefore, when the wire rod 16 put into the circumferential groove 36*c*, the wire rod 16 is curved along the curving circumferential groove 36*c*, the wire rod 16 is in close contact with the circumferential groove 36*c*.

Herewith, it is prevented that the wire rod 16 detaches from the circumferential groove 36c. Therefore, a displacement of the wire rod 16 put into the circumferential groove 36c is reliably prevented, and the shape of the inner coil 13 obtained by regular winding is reliably maintained even in the subsequent enclosing process and outer winding process.

<Enclosing Process>

In this process, by using the outer winding pin 37 including the outer base plate 37a which has a larger periphery than that of the inner base plate 36a and the plurality of outer winding pins 37b erected on the outer base plate 37a which has a larger periphery than that of the inner base plate 36a, the inner coil 13 obtained in the previous process is surrounded by the plurality of outer winding pins 37b.

In the present embodiment using the above-mentioned coil winding apparatus 20 with the outer winding core 37 configured to move freely, in the outer winding core moving mechanism 55, the outer winding core 37 is moved downward from the standby position shown in FIG. 1 by protruding the retracting rod 57a from the hydraulic cylinder 57. As shown in FIG. 5, by moving the plurality of outer winding pins 37b to an enclosing position (i.e., the winding position covering the inner winding pin 36b) that encloses the inner winding pin 36b in the inner winding core 36, the plurality of outer winding pins 37b move to the enclosing position (winding position) where the outer winding pins 37b enclose the inner coil 13 (FIG. 10) comprising the wire rod 16 wound around the inner winding pin 36b.

At this time, the wire rod feeding member moving mechanism 32 adjust the position of the wire rod feeding member 31 so that the wire rod 16 extending from the inner coil 13 to the wire rod feeding member 31 is inserted into between the plurality of outer winding pins 37b as desired, the wire rod 16 is guided from the inner coil 13 to the outside of the plurality of outer winding pins 37b.

<Outer Winding Process>

In this process, by rotating the outer winding core 37 together with the winding core 36, the wire rod 16 fed out from the wire rod feeding member 31 is wound on the plurality of outer winding pins 37b in the outer winding core 37, herewith, the outer coil 14 is produced.

That is, as shown in FIG. 9, the electric motor 26 in the rotating mechanism 25 which has been stopped, is driven again to rotate the outer winding core 37 together with the rotating plate 27 for a further predetermined number of rotations. At the same time, the electric motor 77 installed in the lower table 23 is driven, and the rotation table 73 provided with the wire rod clip 74 which holds the end of the wire rod 16 is rotated a predetermined number of times in the same direction and at the same speed in synchronization with the inner winding core 37. Herewith, the wire rod 16, which is fed out from the wire rod feeding member 31, is wound around the plurality of outer winding pins 37b in the outer winding core 37 for a predetermined number of times.

Herewith, the wire rod 16, which is fed out from the wire rod feeding member 31, is wound around the plurality of outer winding pins 37b in the outer winding core 36 spirally. In fact, in the outer winding pin 37b on which the wire rod 16 is wound, the circumferential groove 37c put the wire rod 16 is formed. Therefore, when the wire rod 16 is wound up, the wire rod feeding member moving mechanism 32 arranges moving of the wire rod feeding member 31 so that the wire rod 16 fed out from the wire rod feeding member 31 put into the prescribed circumferential groove 37c in the outer winding pin 37b.

Then, the wire rod feeding member moving mechanism 32 moves the wire rod feeding member 31 in the axial direction of the rotating plate 27 with the rotation of the outer winding core 37. The wire rod 16, which is fed out from the wire rod feeding member 31, is then wound around the plurality of outer winding pins 37b in a spiral pattern while putting into a predetermined circumferential groove 37c. This constitutes a regular winding such that the adjacent wire rods 16 are parallel to each other and in close contact. Then, after the first layer of coils consisting of the wire rod 16 wound directly on the outer winding pin 37b has been formed, the wire rod 16 is further wound in regular winding over it to make the second and subsequent layers of coils, if necessary.

In this way, as shown in FIG. 11, in this outer winding process, a polygonal-shaped outer coil 14 is produced, the inner coil 14 having a coil end portion 14b made of the wire rod 16 wound on the outer winding pin 36b erected on the outer base plate 37a, and a peripheral parts of the coil 14a made of the wire rod 16 wound between the pair of columnar members 28, 29.

Here, the circumferential groove 37c formed on the outer periphery of the outer winding pin 37b, as shown in FIG. 11, the longitudinal direction of the circumferential groove 37c is formed by curving along the outer periphery of the outer winding pin 37b. Therefore, when the wire rod 16 put into the circumferential groove 37c, the wire rod 16 is curved along the curving circumferential groove 37c, the wire rod 16 is in close contact with the circumferential groove 37c. Herewith, it is prevented that the wire rod 16 detaches from the circumferential groove 37c. Therefore, a displacement of the wire rod 16 put into the circumferential groove 37c is reliably prevented, and the shape of the outer coil 14 obtained by regular winding is reliably maintained.

Since the outer winding pin 37b in the outer winding core 37 is located at a place that covers the coil end portion 13b of the inner coil 13 from the outside, the outer coil 14 comprising the wire rod 16 wound around the outer winding pin 37b is formed to a size that can surround the inner coil 13 from the outside with a predetermined gap. And the sizes of the inner coil 13 and the outer coil 14 are different. Therefore, in the present embodiment, two polygonal shaped the inner coils 13 and the outer coils 14 can be continuously produced in two polygonal shapes of the wire rods 16, which are the coil end portions 13b and 14b, with different lengths.

In addition, the produced inner coil 13 and outer coil 14 are detached from the inner winding core 36 and the outer winding core 37 and transported. In a subsequent process, by using the conventional inserter method, the peripheral parts of the coil 13a, 14a of the inner coil 13 and the outer coil 14 are inserted into slot 11b in the stator core 11 (FIG. 13 and FIG. 14).

Here, the procedure for detaching the inner coil 13 and outer coil 14 from the inner winding core 36 and outer winding core 37 is described here. First, the clamping mechanism not shown in the wire rod feeding member 31 clamps the wire rod 16, thereby prohibiting the wire rod 16 from being newly fed from the wire rod feeding member 31.

The inner coil 13 and the outer coil 14 formed in the inner winding core 36 and the outer winding core 37 are clamped by the shape maintenance tool not shown in the figure. While maintaining the shape of the inner coil 13 and the outer coil 14, the wire rod 16 fed out from the wire rod feeding member to the outer coil 14 is cut by a cutting device or the like. This makes the inner coil 13 and outer coil 14 independent of the wire rod feeding member 31.

In this case, in order to maintain the shape of the inner coil 13 or the outer coil 14 in regular winding, it is preferable to bundle the wire rod 16 comprising the inner coil 13 or outer coil 14 with the adhesive tape, if necessary. Even though the wire rod 16 is bundled with adhesive tape, in this embodiment, the wire rod 16 is wound around a plurality of spaced standing winding pins 36b, 37b, so that the wire rod 16 is suspended in the air between the winding pins 36b, 37b and the winding pins 36b, 37b. For this reason, the wire rod 16 suspended in the air can be easily bundled, and the recess and other configurations formed in the conventional winding core to bundle the wire rod become unnecessary. Therefore, it is prevented from pushing up the prices of coil winding apparatus 20.

Further, the hydraulic cylinder 71 is configured to descend the rotating table 73 to release the lower end surface of the inner winding pin 36b and the outer winding pin 37b.

Thereafter, the holding mechanism 43 reduces the spacing between the one columnar member 28 and the other columnar member 29 by retracting the retractable rod 47a of the hydraulic cylinder 47 as an actuator. This reduces the spacing between the inner winding pin 36b and the outer winding pin 37b on the one columnar member 28 and the other columnar member 29.

Herewith, the inner coil 13 and the outer coil 14 consisting of the wire rod 16 wound around the inner winding pin 36b and outer winding pin 37b, are loosened. Then, the wire rod 16 constituting the inner coil 13 and the outer coil 14 are detached from circumferential groove 36c, 37c in the inner winding pin 36b and the outer winding pin 37b.

Thereafter, the inner coil 13 and the outer coil 14, which are clamped by the shape maintenance tool not shown in the figure and are bundled with adhesive tape as required, are moved downward along with the shape maintenance tool. Then, the inner coil 13 and the outer coil 14, is put to downward than the lower end exposed surface of the inner winding pin 36b and the outer winding pin 37b.

Then, after the inner coil 13 and the outer coil 14 are detached from the inner winding core 36 and the outer winding core 37, the inner winding process described above can be resumed. This can improve the productivity.

The outer coil 14 detached from the outer winding pin 37b is formed to a size that can encompass the outside of the inner coil 13 detached from the inner winding pin 36b, leaving a predetermined gap between the inner coil 13 and the outer coil 14. Therefore, the stator core 12 having the inner coil 13 and the outer coil 14 being wound in regular winding are passed to the slot 11, the peripheral parts of the coil 13a, 14a can be inserted into slot 11b.

Further, the inner coil 13 and the outer coil 14 detached from the inner winding pin 36b and the outer winding pin 37b have different lengths L1 and L2 between their peripheral parts of the coil 13a, 14a respectively. Therefore, as shown in FIG. 12, even if those peripheral parts of the coils 13a, 14a are inserted into different slots 11b respectively, the coil end portion 13b of the inner coil 13 exceeds the coil end portion 14b of the outer coil 14, and the coil end portion 13b of the inner coil 13 is not protruded from the end surface of the core 11. In addition, it is prohibited that the coil end portion 13b of the inner coil 13 overlaps with the coil end portion 14b of the outer coil 14, thereby avoiding a situation in which the forming of the coil end portions 13b, 14b becomes difficult. As a result, the generator and the motor can be made more efficient and smaller in size.

Further, in the embodiment of the present invention, such inner coil 13 and such outer coil 14 are sequentially produced. Therefore, steps required when the inner coil 13 and the outer coil 14 are produced separately, i.e., the step of electrically connecting the inner coil 13 and the outer coil 14 is also not required. Thus, it is also possible to avoid a situation in which the manufacturing process is increased.

According to the above embodiment, it achieves the effects shown below.

The coil winding apparatus 20 according to one embodiment of the present invention is the coil winding apparatus 20 for producing the coils 13, 14 by winding the wire rod 16 around the winding cores 36, 37 rotated by the rotating mechanism 25, in which the winding cores 36, 37 includes a base plates 36a, 37a and the plurality of winding pins 36b, 37b erected on the base plates 36a, 37a. And on the outer periphery of the plurality of winding pins 36b, 37b, circumferential grooves 36c, 37c into which the wire rod 16 puts are formed respectively.

According to this embodiment, since the circumferential grooves 36c, 37c into which the wire rod 16 put on the periphery of the plurality of winding pins 36b, 37b is formed, the wire rod 16 that are directly wound around the plurality of winding pins 36b, 37b is put into the circumferential grooves 36c, 37c in regular winding, and the coils 13, 14 consisting of the wire rod 16 in regular winding are produced, the coils 13, 14 can prevent displacement of the wire rod 16.

Further, the forming the circumferential grooves 36c, 37c on the outer periphery of the winding pins 36b, 37b are easy as compared with the case of forming a groove in a winding core of a drum member matched with an inner shape of a conventional winding core. Therefore, the unit cost of the winding cores 36, 37 can be decreased. Here, the circumferential grooves 36c, 37c are formed on the outer periphery of the winding pins 36b, 37b, and the longitudinal direction of the circumferential grooves 36c, 37c are formed along the outer periphery of the winding pins 36b, 37b. Therefore, when the wire rod 16 put into the circumferential grooves 36c, 37c the wire rod 16 is curved along the curving circumferential grooves 36c, 37c, the wire rod 16 is in close contact with the circumferential grooves 36c, 37c. Herewith, it is prevented that the wire rod 16 detaches from the circumferential grooves 36c, 37c. Therefore, a displacement of the wire rod 16 put into the circumferential grooves 36c, 37c is reliably prevented, and the regular winding state of the wire rod 16 is reliably maintained.

The coil winding apparatus 20 according to another embodiment of the present invention is the coil winding apparatus 20 for producing the coils 13, 14 by winding the wire rod 16 around the winding cores 36, 37 rotated by the rotating mechanism 25, in which the winding cores 36, 37 includes the inner winding core 36 and the outer winding core 37, the inner winding core 36 is provided with the inner base plate 36a and the plurality of inner winding pins 36b erected on the inner base plate 36a for forming the inner coil 13 by winding the wire rod 16 around the inner base plate 36a and erected, the outer winding core 37 is provided with the outer base plate 37a has a larger periphery than the outer periphery of the inner base plate 36a and the plurality of outer winding pins 37b, which make an outer coil 14 surrounding the inner coil 13 by a wire rod 16 erected on the outer base plate 37a. And on both the outer periphery of the plurality of winding pins 36b, 37b, circumferential grooves 36c, 37c into which the wire rod 16 puts are formed respectively.

According to this embodiment, in addition to the above effect is obtained, similarly, even if the winding cores 36, 37 has an inner winding core 36 and an outer winding core 37, circumferential grooves 36c, 37c into which the wire rod 16 put are formed around the periphery of the winding pins 36b, 37b of the inner winding core 36 and the outer winding core 37, then, the inner coil 13 is produced by using the inner winding core 36, and then the outer coil 14 is produced by using the outer winding core 37. As a result, even if the stator coil 12 consists of the inner coil 13 and the outer coil 14 continuing to the inner coil 13, it is possible to produce the stator coil 12 consisting of the inner coil 13 and the outer coil 14 connected to the inner coil 13 in regular winding, which can prevent displacement of the wire rod 16.

In the present embodiment, the rotation mechanism 25 is provided with the rotatable rotating plate 27, the electric motor 26 to rotate the rotating plate 27, and the pair of columnar members 28, 29 erected on the rotating plate 27 so as to put the center of rotation between the pair of columnar members 28, 29. The inner base plate 36a is attached to the tips of the pair of columnar members 28, 29, respectively, and the inner base plate 37a is attached to the tips of the pair of columnar members 28, 29, respectively, which can be moved in the direction of the rotation axis of the rotating plate 27. The coil winding apparatus 20 is further provided with the outer winding core moving mechanism 55 for reciprocating the outer base plate 37a between the winding position in which is the outer winding pin 37b spreading over the inner winding pin 36b and the standby position that the outer winding pin 37b shifted to the direction of the rotation axis of the rotating plate 27.

According to this embodiment, the outer winding core 37 is provided on the pair of columnar members 28, 29 respectively, and by reciprocating the outer winding core 37 between the winding position and the standby position, the enclosing process of the coil winding method is facilitating easily.

In this embodiment, either one or both of the pair of columnar members 28, 29 are movably erected in the radial direction of the rotating plate 27. The coil winding apparatus 20 is further provided with a holding mechanism 43 to hold the spacing between the pair of columnar members 28, 29 to a predetermined value.

According to this embodiment, by erecting one or both of the pair of columnar members 28, 29 in a movable position in the radial direction of the rotating plate 27 and narrowing the distance between the pair of columnar members 28, 29, the inner coil 13 and the outer coil 14 to be obtained can be easily detached from the circumferential grooves 36c, 37c at the winding pins 36b and 37b.

The coil winding method according to an embodiment of the present invention is the method for manufacturing the coils 13, 14 by rotating the winding core 36, 37 and winding a wire rod 16 around the winding core 36, 37, by using a winding core consisting of multiple winding pins 36b, 37b erected on base plates 36a, 37a along the inner circumference of coils 13, 14 that should be obtained, forming circumferential grooves 36c, 37c on the outer circumference of the plurality of winding pins 36b, 37b put the wire rod 16, respectively. Next, the wire rod 16 is wound around the plurality of winding pins 36b, 37b so that the wire rod 16 is suspended between the winding pins 36b, 37b in the air, and the wire rod 16 wound around directly at least the plurality of winding pins 36b, 37b is put into the circumferential grooves 36c and 37c and is wound in regular winding.

In the present embodiment, the coil manufacturing method includes the inner winding process, the enclosing process and the outer winding process. In the inner winding process, the inner winding core 36, having the inner base plate 36 and the plurality of inner winding pins 36b erected on the inner base plate 36a, is used, the circumferential grooves 36c into which put the wire rod 16 are formed on the outer periphery of the plurality of inner winding pins 36b respectively, the wire rid 16 is wound around the plurality of inner winding pins 36b, and the inner coil 13 is produced. In the enclosing process, the outer winding core 37 is used, the outer winding core 37 includes the outer base plate 37a having the outer periphery larger than the outer periphery of the inner base plate 36a and the plurality of outer winding pins 37b erected on the outer base plate 37a, the circumferential grooves 37 are formed the plurality of outer winding pins 37b, the inner coil 13 is enclosed by the plurality of outer winding pins 37b. In the outer winding process, the inner winding core 36 and the outer winding core 37 are rotated together, the wire rod 16 is wound around the plurality of outer winding pins 37b, the outer coil is produced.

In the present embodiment, in the inner winding process, the outer winding core 37 is positioned in the standby position shifted in the direction of the rotation axis from the inner winding core 36, and in the enclosing process, the outer winding core 37 is moved from the standby position to the winding position covering the inner winding pin 36b.

In the above-described embodiment, it has been described in which a wire rod feeding member 31 passes through a plurality of wire rod 16 in a state in which they are brought into close contact with each other in parallel. However, the wire rod feeding member 31 may be such as to pass a single wire rod 16. When the wire rod feeding member 31 is such that a single wire rod 16 is delivered, it is preferable to use a rod-like member having a round hole in a cross section through which a single wire rod 16 is passed.

Further, in the above-described embodiment, the case in which the hydraulic cylinder 71 as the table movement mechanism that lifts and descends the rotating table 73 in the Z-axis direction is described. However, the mechanism capable of moving the rotating table 73 between the proximity position and the separating position can be used. The table moving mechanism is not limited to the hydraulic cylinder. For example, the rotating table 73 may be configured to be moved using a servo motor.

Further, in the above-described embodiment, the case in which the winding core has the inner winding core 36 and the outer winding core 37, and in which the inner coil 13 and the outer coil 14 are produced continuously was described. However, although not shown in Figure, a single coil can also be obtained by using a single winding core with the plurality of winding pins erected along the inner circumference of the single coil to be produced on the base plate. Even if the single winding core is used, by forming a circumferential groove into which the wire rods put into the outer circumference of the plurality of winding pins, the wire rods that are wound around the winding pins can be put into the circumferential groove, thereby making it possible to obtain a coil wound in regular winding. Therefore, it is possible to make coils consisting of wire rods that are aligned and wound in a manner that prevents displacement of the wound wire rods.

Furthermore, in the above-described above embodiment, three inner winding pins 36b and three outer winding pins 37b are mounted on the inner base plate 36a and the outer base plate 37a respectively, and it is described in which a hexagonal inner coil 13 and outer coil 14 are made by a wire rod 16 wound around a total of six inner winding pins 36b and outer winding pin 37b. However, the number of the winding pins is not limited as long as coils 13 and 14 of the required shape can be produced. For example, the number of the winding pins 36b and 37b is not limited to six, but a total of four winding pins may be erected on the base plate to obtain coils forming a quadrilateral shape. Further a total of eight winding pins may be erected on the base plate to obtain an octagonal coil. Furthermore, a total of eight or more winding pins may be mounted in the base plate to obtain an octagonal coil.

Although the embodiments of the present invention have been described in the above, the above-mentioned embodiments merely illustrate a part of application examples of the present invention, and the technical scope of the present invention is not intended to be limited to the specific configurations of the above-described embodiments.

This application claims priority based on Japanese Patent Application No. 2019-096540 filed with the Japan Patent Office on May 23, 2019, the entire contents of which are incorporated into this specification by reference.

The invention claimed is:

1. A coil winding apparatus configured to manufacture a coil by winding a wire rod around a winding core rotated by a rotating mechanism, the coil winding apparatus comprising:
   the rotating mechanism comprising a rotating plate configured to be rotatable and a pair of columnar members erected on the rotating plate so as to put a center of rotation of the rotating plate between the pair of columnar members; and
   the winding core comprising a base plate provided to a tip of the pair of columnar members and a plurality of winding pins erected on the base plate,
   wherein a circumferential groove into which the wire rod is put is formed on a periphery of each of the plurality of winding pins, and
   wherein either or both of the pair of columnar members are movably erected on the rotating plate so as to be movable in a radial direction of the rotating plate.

2. The coil winding apparatus according to claim 1, wherein
   the winding core is an inner winding core, the base plate is an inner base plate, and the plurality of winding pins erected on the inner base plate are a plurality of inner winding pins for manufacturing an inner coil,
   the coil winding apparatus further comprising:
   an outer base plate having a larger circumference than a circumference of the inner base plate; and
   an outer winding core having a plurality of outer winding pins, and the plurality of outer winding pins encircling the inner coil by the wire rod erected on the outer base plate and wound around the wire rod, and
   a circumferential groove into which the wire rod is put is formed on a periphery of each of a plurality of the outer winding pins.

3. The coil winding apparatus according to claim 2, wherein
   the rotating mechanism comprises a drive mechanism for rotating the rotating plate,
   the outer base plate is provided on the pair of columnar members and is movable in a direction of a rotation axis of the rotating plate; and
   the coil winding apparatus further comprises an outer winding core moving mechanism, the outer winding core moving mechanism configured to move the outer winding core between a winding position in which the outer winding pins surround the inner winding pins and a standby position in which the outer winding pins are shifted from the inner winding pins in the direction of the rotation axis of the rotating plate.

4. The coil winding apparatus according to claim 3, further comprising a holding mechanism configured to hold a distance between the pair of columnar members at a predetermined value.

5. A coil winding method for manufacturing a coil by winding a wire rod around a winding core by rotating the winding core, the coil winding method comprising:
   a step of forming a circumferential groove on a periphery of each of a plurality of winding pins erected on a base plate of the winding core along an inner circumference of the coil to be obtained;
   a step of winding the wire rod around the plurality of winding pins so that the wire rod is suspended between the winding pins, wherein the wire rod is directly wound around at least the plurality of winding pins and is put into the circumferential grooves so as to be wound in a regular winding; and
   a step of rotating the winding core using a rotating mechanism, wherein the rotating mechanism comprises:
   a rotating plate configured to be rotatable and a pair of columnar members erected on the rotating plate so as to put a center of the rotation of the rotating plate between the pair of columnar members,
   wherein the base plate of the winding core is provided to a tip of the pair of columnar members, and
   wherein either or both of the pair of columnar members are movably erected on the rotating plate so as to be movable in a radial direction of the rotating plate.

6. The coil winding method according to claim 5, wherein the winding core is an inner winding core, the base plate is an inner base plate, the winding pins are inner winding pins, the coil is an inner coil, and the step of winding is a step of inner-winding, the coil winding method further comprising:
   a step of enclosing the inner coil by a plurality of outer winding pins by using an outer winding core having an outer base plate with a periphery larger than a periphery of the inner base plate, wherein a plurality of outer winding pins are erected on the outer base plate and each have a circumferential groove into which the wire rod is put; and
   a step of outer-winding an outer coil by winding the wire rod by rotating the outer winding core with the inner winding core to wind the wire rod around the plurality of outer winding pins so that the wire rod is suspended between the outer winding pins, and the wire rod that is wound around the plurality of outer winding pins is put into the outer circumferential groove and so as to be wound in a regular winding.

7. The coil winding method according to claim 6, wherein
   in the step of inner-winding, the outer winding core is positioned to a standby position shifted from the inner winding core in a direction of a rotation axis of the rotating plate, and
   in the step of enclosing, the outer winding core is moved from the standby position to a winding position in which the outer winding pins surround the inner winding pins.

* * * * *